United States Patent
Sayman

(10) Patent No.: US 10,579,674 B2
(45) Date of Patent: Mar. 3, 2020

(54) GENERATING AND SHARING DIGITAL VIDEO PROFILES ACROSS COMPUTING DEVICES UTILIZING A DYNAMIC STRUCTURE OF UNPOPULATED VIDEO SILOS

(71) Applicant: Facebook, Inc., Menlo Park, CA (US)

(72) Inventor: Michael Arthur Sayman, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 310 days.

(21) Appl. No.: 15/394,356

(22) Filed: Dec. 29, 2016

(65) Prior Publication Data

US 2018/0189392 A1    Jul. 5, 2018

(51) Int. Cl.
*G06F 16/00* (2019.01)
*G06F 16/71* (2019.01)
*H04L 29/08* (2006.01)

(52) U.S. Cl.
CPC ............ *G06F 16/71* (2019.01); *H04L 67/306* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,871,752 | B2 * | 1/2018 | Bartkiewicz | ............ G06F 3/048 |
| 2010/0306708 | A1 * | 12/2010 | Trenz | .................... G06F 3/0482 715/853 |
| 2013/0018960 | A1 * | 1/2013 | Knysz | .................... G06Q 50/01 709/204 |
| 2013/0024901 | A1 * | 1/2013 | Sharif-Ahmadi | ........................... H04N 21/44218 725/114 |
| 2013/0120666 | A1 * | 5/2013 | Sharif-Ahmadi | ....... H04L 67/28 348/734 |
| 2013/0122938 | A1 * | 5/2013 | Sharif-Ahmadi | ....... G06F 16/40 455/456.3 |
| 2013/0125014 | A1 * | 5/2013 | Sharif-Ahmadi | ........................... H04N 21/4402 715/748 |
| 2013/0125157 | A1 * | 5/2013 | Sharif-Ahmadi | ........................... H04N 21/2665 725/14 |
| 2013/0125164 | A1 * | 5/2013 | Sharif-Ahmadi | ....... H04L 67/22 725/31 |
| 2015/0033153 | A1 * | 1/2015 | Knysz | .................... G06Q 50/01 715/753 |
| 2015/0156150 | A1 * | 6/2015 | Bartkiewicz | ............ G06F 3/048 715/752 |

(Continued)

*Primary Examiner* — Farhan M Syed
(74) *Attorney, Agent, or Firm* — Keller Jolley Preece

(57) ABSTRACT

One or more embodiments of the disclosure include a digital video profile system that generates video profiles utilizing a video silo structure. In particular, in one or more embodiments, the digital video profile system generates a video silo structure comprising a plurality of unpopulated video silos. In addition, the digital video profile system receives a digital video and populates an unpopulated video silo utilizing the digital video. Further, in one or more embodiments, the digital video profile system modifies the video silo structure based on the received digital video. Moreover, the digital video profile system can share video profiles across users and further modify video silo structures based on interactions with video profiles of other users.

20 Claims, 25 Drawing Sheets

(56) References Cited

U.S. PATENT DOCUMENTS

| | | | | |
|---|---|---|---|---|
| 2015/0312305 A1* | 10/2015 | Totzke | ................. | H04L 67/322 709/219 |
| 2016/0063440 A1* | 3/2016 | Webb | .................... | G06Q 10/10 705/7.24 |

* cited by examiner

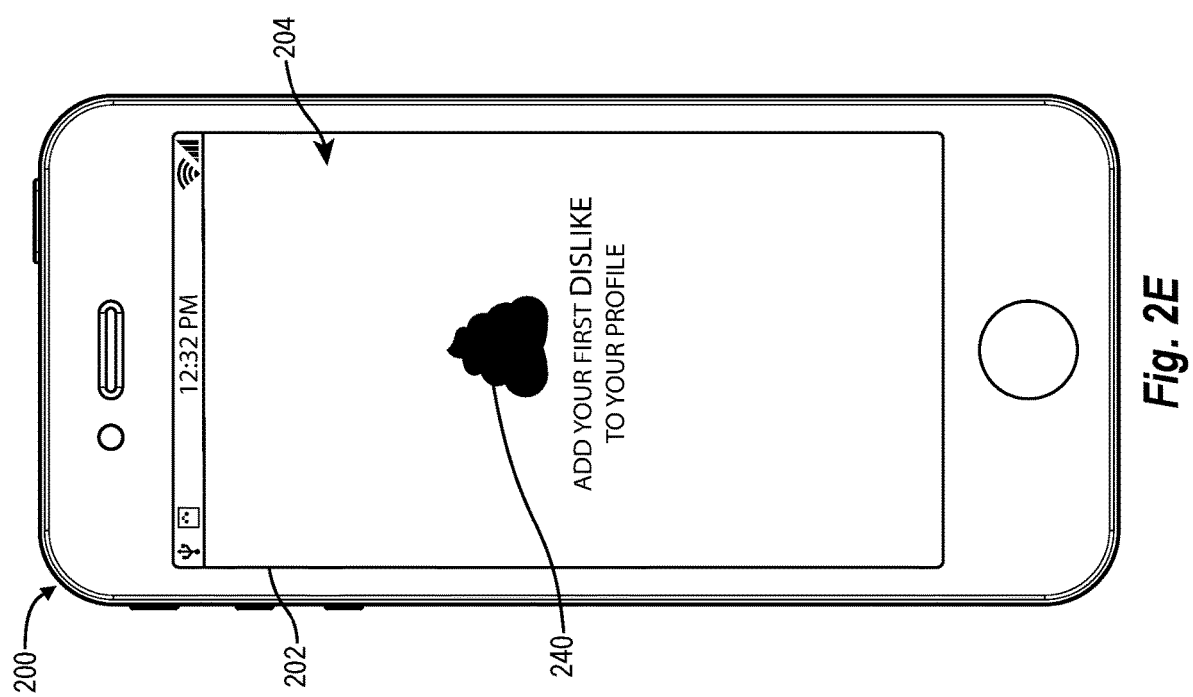

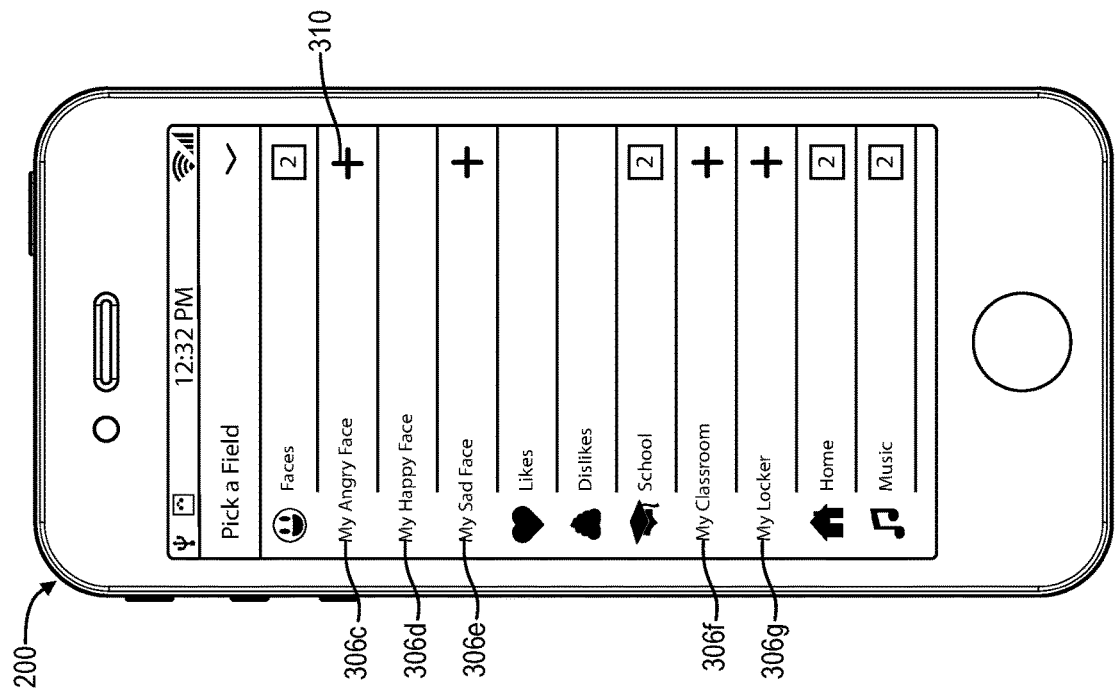
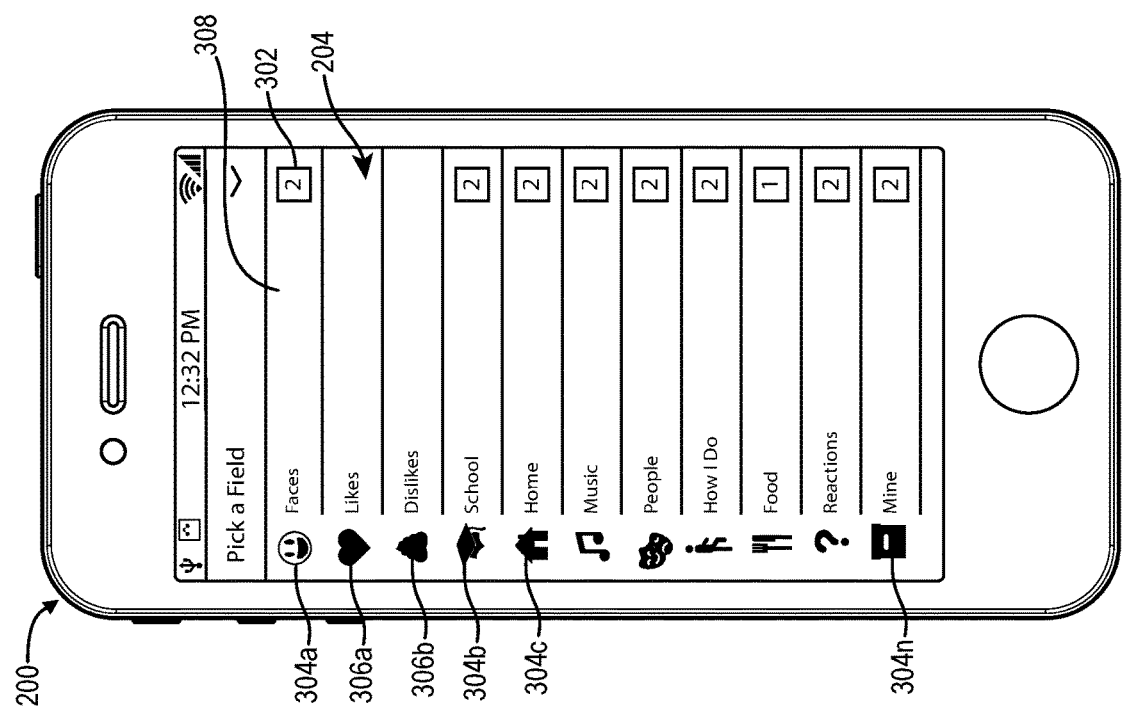
Fig. 3B
Fig. 3A

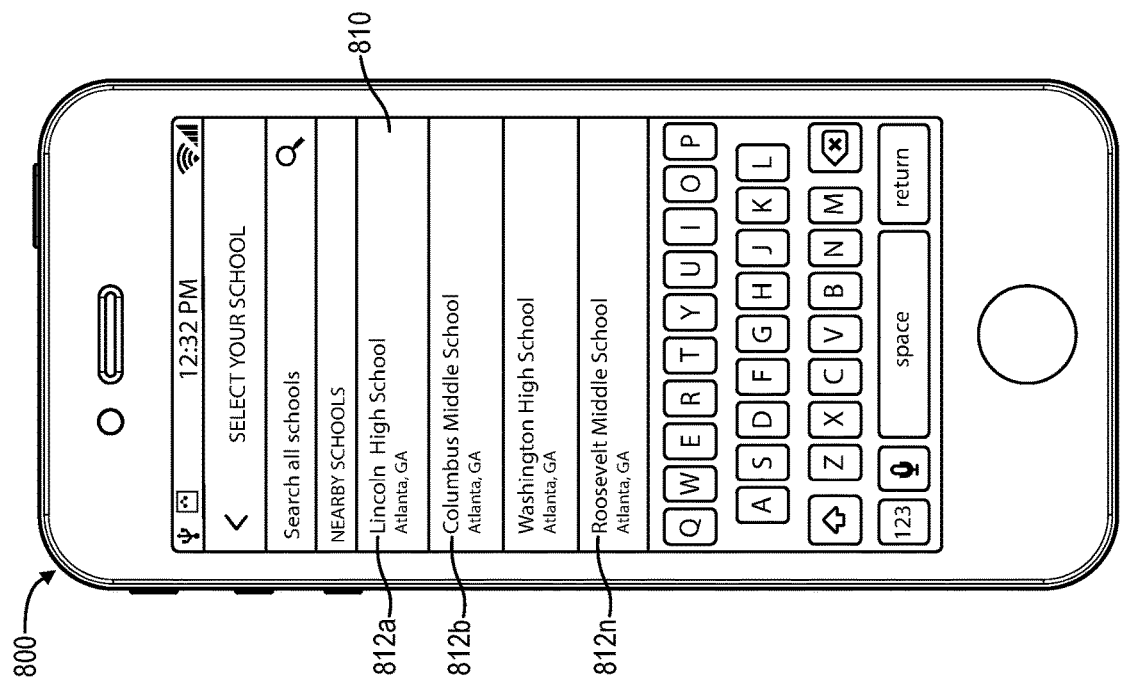
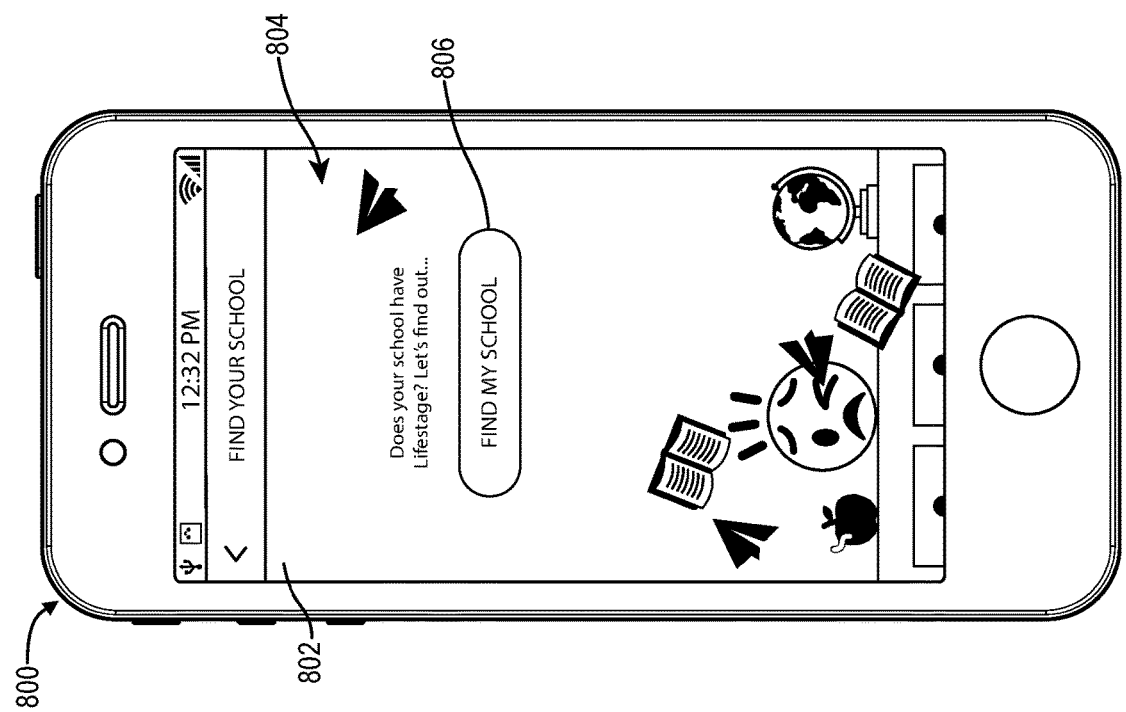
Fig. 8B
Fig. 8A

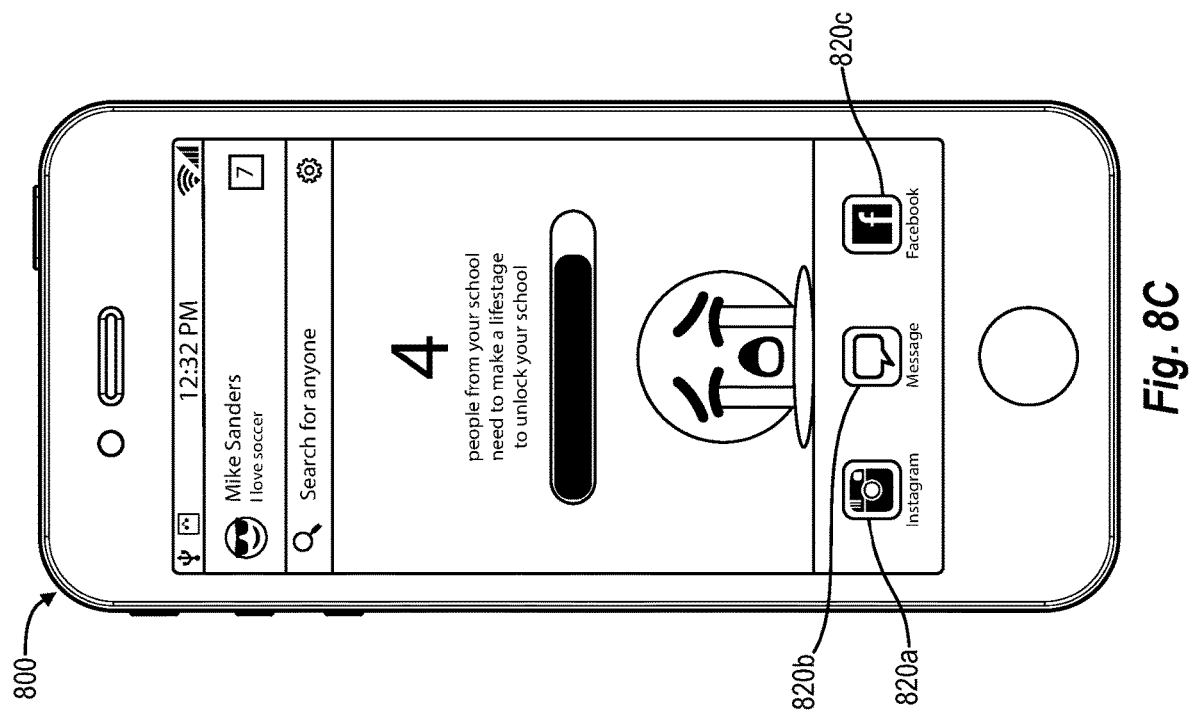

GENERATING AND SHARING DIGITAL VIDEO PROFILES ACROSS COMPUTING DEVICES UTILIZING A DYNAMIC STRUCTURE OF UNPOPULATED VIDEO SILOS

BACKGROUND

Recent years have seen rapid development in digital systems that enable individuals to digitally communicate and connect with other users. Indeed, as a result of proliferation in smartphones, tablets, laptops, computers, smart watches, smart televisions, and other computing devices, individuals have increased access to devices capable of sending and receiving information in relation to other individual users. Accordingly, developers have generated a variety of digital applications that allow clients to utilize computing devices to participate in a variety of forms of digital communication. For example, consumers currently have access to a variety of messaging applications and other software solutions that allow them to share digital videos with other users.

To illustrate, some conventional digital systems allow users to send permanent or temporary individual messages that contain digital videos, digital images, and/or text to other users. Similarly, other conventional digital systems allow users to share digital video and digital image albums with other users. Although such conventional digital video systems allow users to communicate and share digital videos with other users, these systems still have a variety of shortcomings.

For instance, it is often difficult to share a plurality of digital videos in a cohesive fashion utilizing conventional messaging systems, as messages are generally organized based on when they are sent or received. Similarly, users often express frustration with conventional systems that share digital videos albums because users must search through a variety of digital videos (and/or digital images) in the album to identify digital videos of interest. Moreover, although users can manually organize digital videos in albums, it is often time consuming and difficult to capture, arrange, and transmit digital videos to other users.

In addition, conventional digital video systems often result in duplicated, wasteful utilization of computer resources. For example, conventional digital video systems that rely on digital messaging to transmit digital videos often result in repetitive data storage and transmission across numerous devices, which can result in inefficient utilization of memory and computer processing capabilities. For example, utilizing messaging software to send and/or receive digital videos often results in storage of the digital video on a sending client device, a server, and one or more recipient client device. Moreover, as users send digital videos to multiple recipients in multiple messages, conventional digital video systems often exponentially multiply inefficiencies in storage and processing (e.g., by storing a digital video multiple times within multiple conversations on multiple client devices and multiple servers). This is particularly troublesome as users that frequently capture and share digital videos are often susceptible to exhausting memory constraints of their digital devices.

These and other problems exist with regard to conventional digital information systems for communicating and sharing digital videos with other users.

SUMMARY

One or more embodiments described below provide benefits and/or solve one or more of the foregoing or other problems in the art with systems and methods for generating digital video profiles. In particular, in one or more embodiments, the disclosed system and methods generate digital video profiles utilizing a video silo structure. Specifically, the disclosed systems and methods can utilize unpopulated video silos arranged in a video silo structure to suggest digital videos for client devices to capture. Moreover, the disclosed systems and methods can populate unpopulated video silos based on videos received via client devices and modify the video silo structure in response to the received video. In this manner, the disclosed systems and methods can dynamically generate a video profile corresponding to a user, and share video profiles among other users in a community.

For example, in one or more embodiments, the disclosed systems and methods generate a video profile corresponding to a first user, wherein the video profile comprises a subset of unpopulated video silos arranged in a video silo structure, the subset of unpopulated video silos selected from a plurality of pre-defined video silos. Moreover, the disclosed systems and methods populate a video silo of the subset of unpopulated video silos with a video received from a first client device of the first user. In addition, in response to populating the video silo, the disclosed systems and methods modify the video silo structure to add at least one additional unpopulated video silo from the plurality of pre-defined video silos to the video profile of the first user.

By utilizing video silos arranged according to a video silo structure, the disclosed systems and methods can generate and present video profiles to a community of users in an organized, efficient, and entertaining manner. Furthermore, by utilizing a video silo structure, the disclosed systems and methods can avoid forcing users to view a plurality of irrelevant or undesirable digital videos in order to identify relevant, desired content. In addition, by modifying video silo structures based on videos captured by users (and/or user interaction with video profiles of other users) the disclosed systems and methods automatically provide a dynamic, evolving experience for sharing digital videos between users.

In addition, the disclosed systems and methods can further improve efficiency of various computing devices utilized to share generated video profiles. As an initial matter, by utilizing pre-defined video silos (and limiting the number of digital videos associated with each video silo), the disclosed systems and methods can automatically filter the number and variety of digital videos that a user generates and shares with others. Moreover, in one or more embodiments, the disclosed systems and methods capture digital videos within a designated application on a client device that uploads the digital videos to a server without permanently storing the digital videos on the generating client device. Similarly, the disclosed systems can temporarily provide digital videos to other client devices. Accordingly, the disclosed systems and methods can make a video profile available to an entire community of users, without duplicative, unnecessary storage of the digital video within and across client devices.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

FIGS. 2A-2E illustrate a computing device and user interface for generating a video profile by capturing digital videos in accordance with one or more embodiments;

FIGS. 3A-3B illustrates a computing device and user interface displaying a representation of a video silo structure in accordance with one or more embodiments;

FIGS. 8A-8C illustrate a computing device and user interface for selecting a community in accordance with one or more embodiments;

DETAILED DESCRIPTION

Figure 1A:
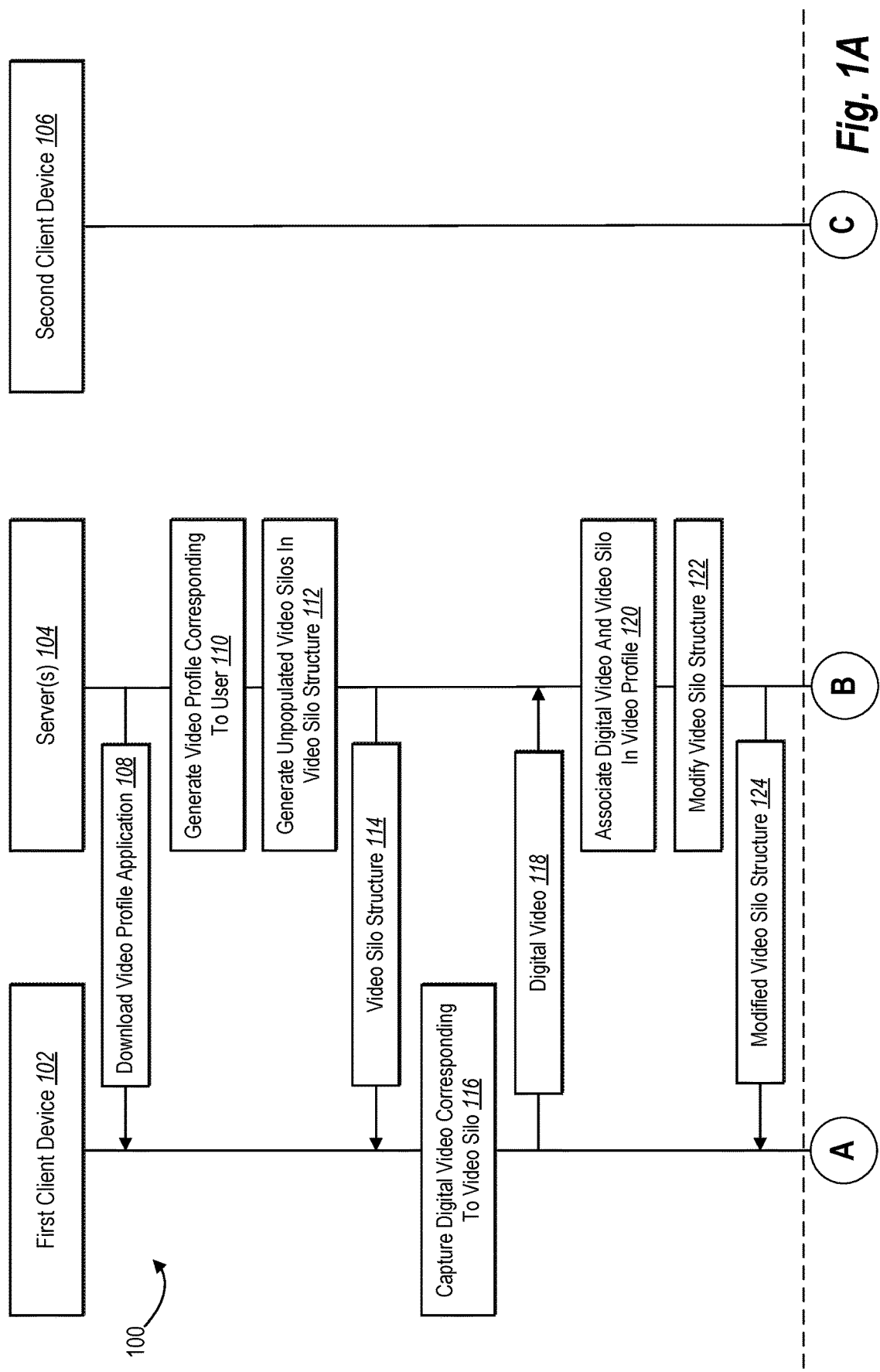
FIGS. 1A-1C illustrate a sequence diagram of a plurality of steps in a method of generating a video profile in accordance with one or more embodiments.

One or more embodiments of the present invention include a digital video profile system that generates one or more video profiles. In particular, in one or more embodiments, the digital video profile system generates video profiles utilizing video silos arranged in a video silo structure. For instance, the digital video profile system can provide a plurality of unpopulated video silos and arrange the unpopulated video silos in a video silo structure. The digital video profile system can then present the video silo structure to a user, prompting the user to populate video silos with corresponding digital videos. Upon receiving a digital video corresponding to a video silo, the digital video silo structure can modify the video silo structure and present the video profile to the user and other users within a community. In this manner, the digital video profile system can provide a new, dynamic, ordered, and efficient way to generate and share video profiles among a community of users.

Indeed, by utilizing video profiles generated based on video silos arranged in a video silo structure, the digital video profile system can provide a number of advantages over existing digital video systems. For example, the video silo structure provides an organization and arrangement of digital videos that allows users to more easily and conveniently share a plurality of digital videos with other community members. To illustrate, users need not view digital videos in the context of individual messages interspersed with other unrelated messages; rather, the video silo structure can provide a logical, ordered arrangement of digital videos that allow users to create an overarching user profile reflecting a cohesive digital expression of a user's interests and personality.

In addition, the digital video profile system can share a plurality of digital videos regarding a user with a community without requiring community members to sort through a morass of irrelevant digital videos. Indeed, by utilizing a video silo structure, the digital video profile system allows users to quickly and easily identify digital videos of interest (e.g., new digital videos or digital videos corresponding to particular topics or categories). Accordingly, the digital video profile system can decrease time, effort, and frustration associated with sharing digital videos, and do so within a unique, entertaining digital environment.

Furthermore, by modifying video silo structures, the digital video profile system also provides a dynamic method for continuing to generate and build a video profile that reflects the individual interests of a user. Indeed, the digital video profile system can modify a video silo stricture for a particular user video profile by adding video silos and/or categories based on digital videos previously captured by the digital video profile system and/or perceived interests of the user. In this manner, the digital video profile system can dynamically create a video profile unique to individual users.

Moreover, as mentioned previously, the digital video profile system can also improve computing devices utilized to share digital videos within a community of members. Indeed, in one or more embodiments, the digital video profile system captures digital videos in a dedicated local application and transmits captured digital videos to a remote server. Moreover, the dedicated local application can then avoid local storage of the digital videos on individual client devices, reducing the memory requirements on user computing devices. This is significant in light of the fact that users that frequently capture and share digital videos often exhaust the limited storage capacity of client devices (e.g., smartphones).

Furthermore, the digital video profile system also reduces the sheer volume of digital videos stored across client devices. Indeed, by providing a video silo structure comprising individual video silos, by limiting the number of videos that can be associated with individual video silos, and/or by limiting the number of video silos available to a user at any given time, the digital video profile system focuses digital video capturing and limits extraneous, random digital videos on the client device and corresponding servers.

As mentioned above, in one or more embodiments, the digital video profile system provides a plurality of unpopulated video silos in a video silo structure. In particular, the digital video profile system can select a plurality of unpopulated video silos from a plurality of pre-defined video silos. For example, the digital video profile system can maintain a plurality of pre-defined unpopulated video silos, where each video silo corresponds to a particular topic and/or category. The digital video profile system can select a subset of the pre-defined unpopulated video silos and arrange the selected subset of unpopulated video silos into a video silo structure by grouping the video silos based on the topics and/or categories associated with each video silo.

By arranging the video silos into a video silo structure, the digital video profile system can provide an ordered arrangement for users to utilize in creating videos for a video profile. For example, the digital video profile system can provide a user interface that includes the video silo structure and prompt the user to capture digital videos corresponding to the unpopulated video silos in the video silo structure. Moreover, the digital video profile system can capture a digital video and associate the digital video with a video silo in the video silo structure.

As mentioned above, upon capturing a digital video corresponding to a video silo, the digital video profile system can also modify the video silo structure. For example, the digital video profile system can add a new unpopulated video silo, add a new category of video silos, or otherwise modify the video silo structure. The digital video profile system can modify the video silo structure based on a variety of factors, such as a topic or category associated with the captured digital video, a number of videos corresponding to a particular category, a perceived interest of a user, or some other factor.

Upon modifying the video silo structure, the digital video profile system can also provide the modified video silo structure for display. For example, the digital video profile system can provide a user interface for display that includes additional unpopulated video silos, prompting the user to capture additional digital videos corresponding to the unpopulated video silos. Similarly, the digital video profile system can also allow a user to navigate between and view captured digital videos and corresponding video silos.

Moreover, the digital video profile system can also provide a video profile for display to other users. For example, in one or more embodiments, the digital video profile system provides a user interface for display to client devices that includes a list of indicators of video profiles corresponding to a variety of users in a community. Users can interact with the list of indicators to view video profiles of other members of the community. For example, the digital video profile system can provide for display the video profile (and corresponding videos and video silos) of a first user to a client device of a second user.

Furthermore, the digital video profile system can also modify video silo structures based on community interaction with other video profiles. For example, in one or more embodiments, the digital video profile system can provide a video profile of a first user for display to a client device of a second user. The digital video profile system can detect interaction by the second user with video silos of the first user and modify a video silo structure corresponding to the second user based on the interaction.

Similarly, in one or more embodiments, the digital video profile system allows users to generate customized video silos. For example, the digital video profile system can provide a user interface for creating an unpopulated video silo that the user can then populate with a digital video. Moreover, users in a community can share custom video silos across video silo structures. In addition, in one or more embodiments, the digital video profile system can add customized video silos to a set of pre-determined video silos (e.g., based on the extent that a customized video silo is utilized within a community). In this manner, the digital video profile system can further provide a dynamic, organic environment for building a video silo structure and sharing digital videos within a community.

The digital video profile system can also provide a variety of features to protect individual users. For example, in one or more embodiments, the digital video profile system places limits on members that may join a community (e.g., age limits, location limits, or requirements for enrollment in a school). Similarly, in one or more embodiments, the digital video profile system includes blocking and reporting features for individuals that abuse the digital video profile system with inappropriate actions or content. Furthermore, the digital video profile system can include a variety of privacy settings that allow users to control the extent to which their video profiles are disseminated to other users.

As used herein, the term "video profile" refers to a collection of digital videos corresponding to a user. In particular, the term "video profile" includes a collection of digital videos associated with a user that correspond to video silos. For example, a "video profile" can include a collection of digital information (e.g., a database, spreadsheet, or other data structure) that associates digital videos, video silos, and a user of the digital video profile system.

As used herein, the term "video silo" refers to a digital element associated with a digital video. In particular, the term "video silo" can include a digital element capable of including a digital video. For instance, a video silo can include a digital element corresponding to a topic, category, theme, and/or subject that is associated with a digital video. For example, the term "video silo" can include a digital element with a label corresponding to a topic, where the user can add a digital video corresponding to the digital element and the topic. Thus, as used herein, the term "unpopulated video silo" refers to a video silo that does not include a digital video (i.e., is not associated with a digital video). A "populated video silo" refers to a video silo that includes a digital video (e.g., is associated with a digital video).

As used herein, the term "video silo structure" refers to an arrangement of video silos according to categories. In particular, the term "video silo structure" includes a digital grouping of video silos into a plurality of categories. For example, in relation to a video silo corresponding to a topic of "My Grades," the digital video profile system can group the video silo with other video silos corresponding to the category of "School."

As used herein, the term "digital video" refers to a digital item that represents a sequence of digital images. In particular, the term "digital video" includes a digital file that defines a sequence of digital images that, when combined, form a moving picture. For example, the term "digital video" includes files of the following type: FLV, F4V, GIF, AVI, MOV, QT, WMV, RM, MP4, M4P, M4V, MPG, MPEG, 3GP, or 3G2.

Figure 1B:
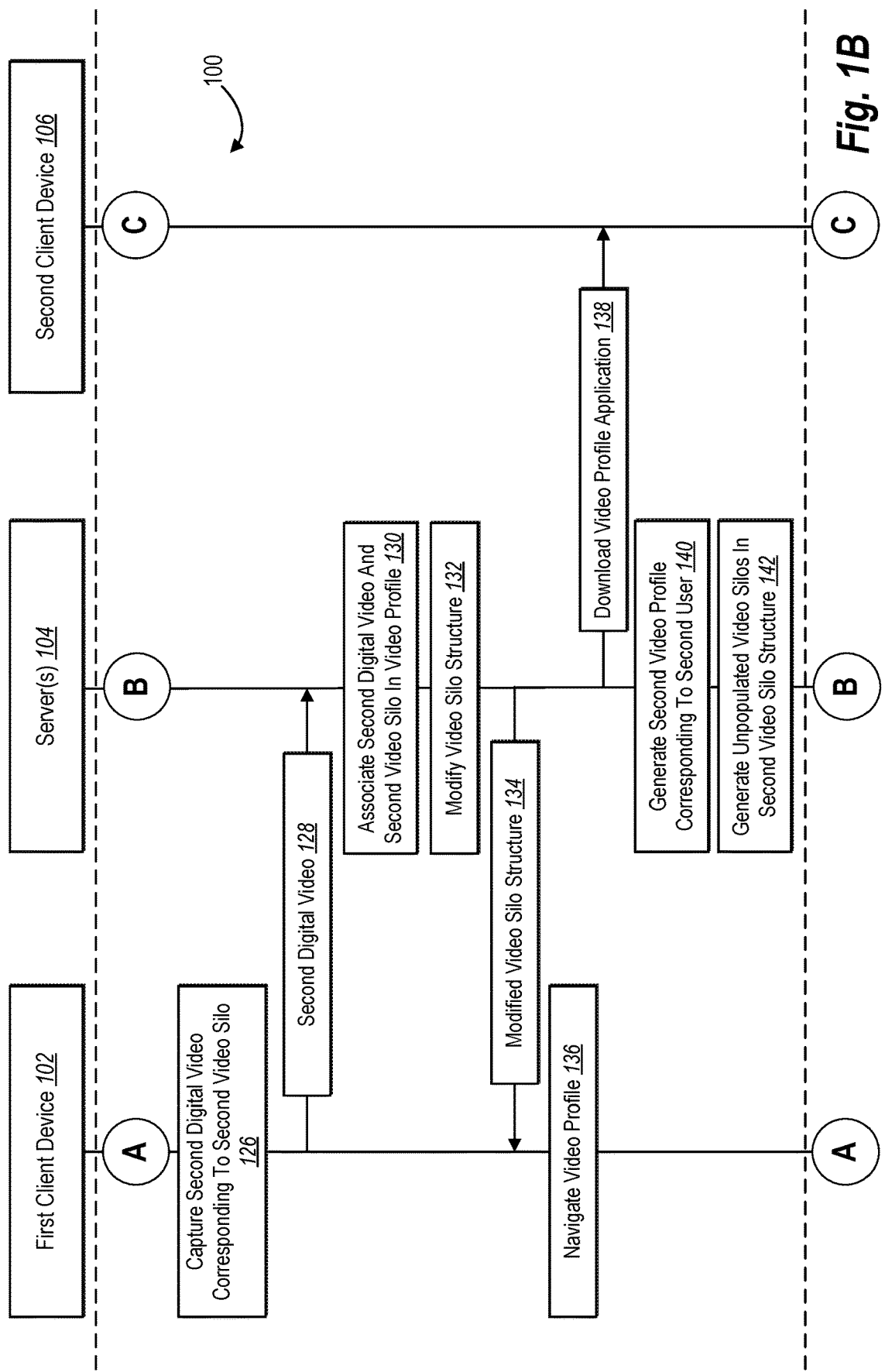
Figure 1C:
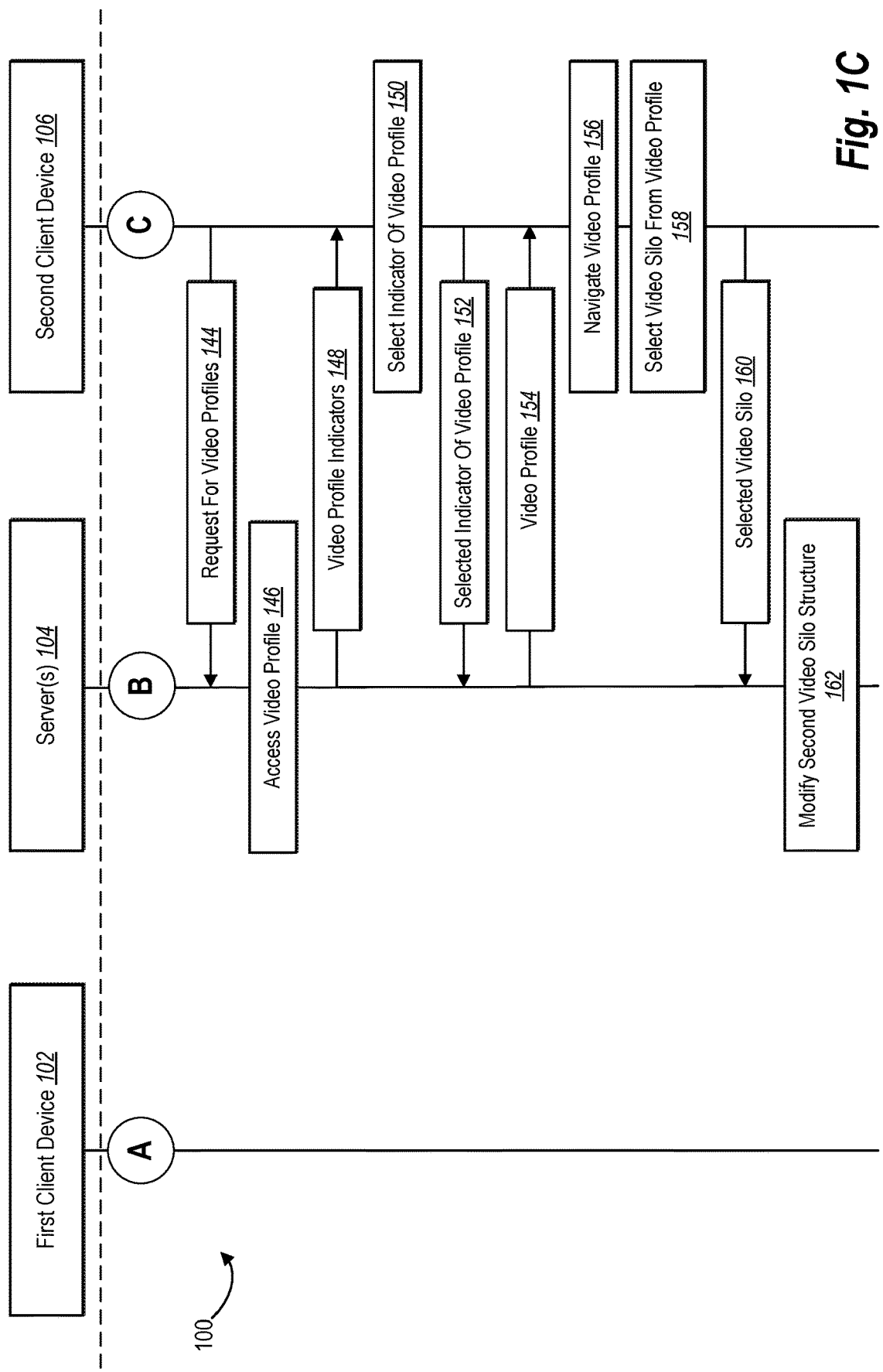

Turning now to FIGS. 1A-1C, additional detail will be provided regarding generating a video profile utilizing a video silo structure in accordance with one or more embodiments. In particular, FIGS. 1A-1C illustrate a representation of a sequence of steps 108-162 performed by a digital video profile system 100 for generating video profiles.

For instance, FIGS. 1A-1C show the digital video profile system 100 can reside in part on a first client device 102, server(s) 104, and a second client device 106. In particular, as discussed in more detail below, the digital video profile system 100 can comprise computer-executable instructions that, when executed by the first client device 102, the server(s) 104, and/or the second client device 106, cause the first client device 102, the server(s) 104, and/or the second client device 106 to perform the steps 108-162 shown in the sequence diagram of FIGS. 1A-1C. The first client device 102 and/or the second client device 106 can comprise a computing device, such as a desktop, laptop, tablet, or mobile device such as a smartphone (e.g., a computing device described below in relation to FIG. 13). Moreover, the server(s) 104 can comprise a data server and/or a system that stores one or more social graphs with edges and nodes corresponding to users of a social networking system (as described in greater detail in relation to FIGS. 11, 13).

As illustrated in FIG. 1A, the digital video profile system 100 performs the step 108 of downloading a video profile application to the first client device 102. In particular, the step 108 can comprise providing and installing a video profile application as well as verifying the first client device 102 and/or a user corresponding to the first client device 102. For example, the step 108 can comprise obtaining credentials (e.g., user name and password) from the first client device 102, authenticating the first client device 102 (e.g., sending a verification code to the first client device 102 and receiving the verification code from the first client device 102), obtaining and checking qualification parameters regarding a user (e.g., that a user satisfies age limits, location limits, that a user belongs to a particular community such as a school, or other limitations), and otherwise verifying the first client device 102 and/or the user of the first client device 102.

As shown in FIG. 1A, upon downloading the first client device 102, the server(s) 104 perform the step 110 of generating a video profile corresponding to a user of the first client device 102. Moreover, the server(s) 104 perform the step 112 of generating unpopulated video silos in a video silo structure. For example, the digital video profile system 100 can generate a video profile and select a plurality of unpopulated video silos from a pre-defined set of video silos to include in the video profile. Further, the digital video profile system 100 can arrange the selected plurality of video silos according to a video silo structure. In particular, the digital video profile system can arrange the video silos into a video silo structure by grouping the video silos into one or more categories and/or sub-categories.

As shown in FIG. 1A, the digital video profile system 100 can also perform the step 114 of providing the video silo structure to the first client device 102. In particular, in one or more embodiments, the digital video profile system 100 provides the video silo structure for display via the first client device 102. For example, the digital video profile system 100 can provide the video silo structure for display by providing a plurality of indications of individual unpopulated video silos arranged in categories according to the video silo structure.

In providing the video silo structure to the first client device 102, the digital video profile system 100 can prompt a user of the first client device 102 to capture digital videos. Indeed, in one or more embodiments, the digital video profile system 100 provides notifications, messages, or other express prompts for a user to capture digital videos corresponding to particular unpopulated video silos. For example, in one or more embodiments, the digital video profile system 100 provides a notification to capture one or more digital videos corresponding to particular video silos before providing the remainder of the video silo structure for display.

As illustrated in FIG. 1A, the first client device 102 can also perform the step 116 of capturing a digital video corresponding to a video silo. For example, a user of the first client device 102 can select a video silo and utilize a digital camera operatively connected to the first client device 102 to capture a digital video to populate the corresponding video silo.

Moreover, as shown in FIG. 1A, the first client device 102 can perform the step 118 of sending the digital video to the server(s) 104. In particular, the step 118 can comprise sending the captured digital video together with an indication of a video silo corresponding to the captured digital video.

Moreover, upon receiving the digital video, the server(s) 104 can perform the step 120 of associating the digital video and the corresponding video silo in the video profile. For example, the server(s) 104 can store the digital video and associate the digital video with the video silo via a database entry in the video profile. In other words, the server(s) 104 can populate the unpopulated video silo with the received digital video.

As shown in FIG. 1A, upon receiving a digital video from the first client device 102, the server(s) 104 can also perform the step 122 of modifying the video silo structure of a user profile. For example, in one or more embodiments, the server(s) 104 modify the video silo structure to add one or more unpopulated video silos and/or one or more categories of video silos. To illustrate, upon receiving a digital video from the first client device 102, the server(s) 104 can determine a category corresponding to the digital video and add an unpopulated video silo to the determined category.

As shown, the digital video profile system 100 can also perform the step 124 of sending the modified video silo structure to the first client device 102. For example, the digital video profile system 100 can provide the modified video silo structure for display via the first client device 102 (e.g., by providing an indicator corresponding to each category, populated video silo, and/or unpopulated video silo).

As illustrated in FIG. 1B, the digital video profile system 100 can repeatedly capture digital videos, associate the digital videos with video silos, and modify the video silo structure. Indeed, the digital video profile system 100 can perform the step 126 of capturing a second digital video corresponding to a second video silo, perform the step 128 of sending the second digital video to the server(s) 104, perform the step 130 of associating the digital video and the corresponding video silo in the video profile, perform the step 132 of modifying the video silo structure (e.g., based on the second digital video), and perform the step 134 of sending the modified video silo structure to the first client device 102. In this manner, the digital video profile system 100 can populate a video profile while dynamically modifying a video silo structure based on the digital videos received from the first client device 102.

As shown in FIG. 1B, the first client device 102 can also perform the step 136 of navigating the video profile. In particular, the digital video profile system 100 can provide for display, via the first client device 102, captured digital videos corresponding to video silos and allow a user to navigate through (e.g., view) the various digital videos. For example, the digital video profile system 100 can enable the user to scroll between digital videos within a category or scroll between categories of digital videos in the video silo structure.

For instance, in one or more embodiments, the digital video profile system 100 provides a digital video for display together with an indication of the corresponding video silo (e.g., an overlay that identifies a topic of the video silo). Upon user interaction with the digital video, the digital video profile system 100 can navigate between digital videos in the video profile. To illustrate, based on a first user interaction with a digital video, the digital video profile system 100 can provide a second digital video for display within the same category of the video silo structure. Similarly, based on a second user interaction with the second digital video, the digital video profile system 100 can provide a third digital video for display from a different category of the video silo structure. In this manner, users can easily navigate between digital videos in a video profile to review captured digital videos and corresponding video silos.

As discussed previously, the digital video profile system 100 can also share video profiles with other users in a community. Indeed, the digital video profile system 100 can allow users to view and interact with video profiles corresponding to other users. Thus, as shown in FIG. 1B, the server(s) 104 can also perform the step 138 of downloading a video profile application to the second client device 106, perform the step 140 of generating a second video profile corresponding to a second user (i.e., the user of the second client device 106); and perform the step 142 of generating unpopulated video silos in a second video silo structure corresponding to the second video profile. Although not shown, the digital video profile system 100 can also capture digital videos and modify the second video silo structure in relation to the second client device 106 (e.g., the digital video profile system 100 can perform steps 114-136 in relation to the second client device 106).

Moreover, as illustrated in FIG. 1C, the second client device 106 can perform the step 144 of sending a request for video profiles to the server(s) 104. In response, the server(s) 104 can perform the step 146 of accessing video profiles. For example, the server(s) 104 can access video profiles corresponding to other users of the digital video profile system 100. To illustrate, the server(s) 104 can access the video profile corresponding to the user of the first client device 102.

In one or more embodiments, the digital video profile system 100 controls the video profiles accessible to other users. For example, in one or more embodiments, the digital video profile system 100 controls video profiles so that a client device can only access video profiles of other users that belong to a particular group, region, or community. To illustrate, in one or more embodiments, the digital video profile system 100 only allows users to access video profiles of other users in the same school or in the same geographic region. Similarly, in one or more embodiments, the digital video profile system 100 only allows a user to access video profiles of other users (e.g., friends) that have given permission to allow the user to access their video profiles.

As shown in FIG. 1C, the digital video profile system 100 can perform the step 148 of providing video profile indicators to the second client device 106. In particular, the step 148 can include providing indicators of video profiles that the second user of the second client device 106 (i.e., the second user) is permitted to access. The video profile indicators can include various types of information regarding video profiles. For example, the video profile indicators can include information regarding the number of digital videos in a video profile, the name (or other identifying information of a user) corresponding to a video profile, the number of populated and/or unpopulated video silos, the number of digital videos added to a video profile within a particular period of time, or recent activity in relation to a video profile.

The digital video profile system 100 can also arrange the video profiles in a particular order. For example, the digital video profile system 100 can arrange video profiles based on region, community (e.g., same attending school or nearby schools), number of digital videos, time since last capturing a digital video, or other factors.

In one or more embodiments, the digital video profile system 100 provides the video profile indicators to the second client device 106 for display. For example, the second client device 106 can display a list of video profile indicators. In this manner, the digital video profile system 100 can provide information to the second user of the second client device 106 regarding video profiles of others. For example, the second client device 106 can display a list of visual indicators that provide information regarding recent digital videos in other user's video profiles or the number of populated video silos in other user's video profiles.

As shown in FIG. 1C, the digital video profile system 100 can also perform the step 150 of selecting an indicator of a video profile and the step 152 of sending the selected indicator of the video profile to the server(s) 104. For example, the steps 150, 152 can comprise receiving user interaction with an indicator of a video profile and sending the user interaction (or an indication of the video profile) to the server(s) 104. To illustrate, the second user can select an indicator of the video profile corresponding to the user of the first client device and the second client device 106 can send an indication of the video profile to the server(s) 104.

In response to receiving the selected indicator of the video profile, the server(s) 104 can perform the step 154 of providing a video profile to the second client device 106. In particular, the server(s) 104 can provide digital videos (and/or the video silo structure) corresponding to a video profile to the second client device 106. For example, the server(s) 104 can send the video profile of the user of the first client device 102 to the second client device 106 (e.g., such that the second user can view captured digital videos via the second client device 106).

The second client device 106 can also perform the step 156 of navigating the video profile. For example, the second client device 106 can view digital videos and video silos corresponding to the video profile of the user of the first client device 102. Moreover, the second client device 106 can also view the video silo structure corresponding to the video profile of the user of the first client device 102. In this manner, the digital video profile system 100 can enable users to view and interact with video profiles of other users.

The digital video profile system 100 can also modify a video silo structure of the second user based on user interaction with the video profile of the first user. For example, as shown in FIG. 1C, the second client device 106 can perform the step 158 of selecting a video silo from the video profile. To illustrate, the video profile of the first user of the first client device 102 may include a video silo not included in the video profile of the second user of the second client device 106. The second user can select, via the second client device 106, the video silo from the video profile of the first user of the first client device 102.

Moreover, as shown, the second client device 106 can perform the step 160 of sending the selected video silo to the server(s) 104. Moreover, in response, the server(s) 104 can perform the step 162 of modifying the second video silo corresponding to the second user. In particular, the server(s) 104 can modify the second video silo structure to include the selected video silo (from the step 160). Specifically, the server(s) 104 can add an unpopulated video silo corresponding to the selected video silo to the second video silo structure of the second user. Moreover, the server(s) 104 can provide the modified video silo structure to the second client device 106 so that the user can populate the added video silo with a digital video. In this manner, the digital video profile system 100 can modify video silo structures and video profiles based on user interaction with the video profiles of other users.

It will be appreciated that the method described in relation to FIGS. 1A-1C is intended to be illustrative of one or more methods in accordance with the present disclosure, and is not intended to limit potential embodiments. Alternative embodiments can include additional, fewer, or different steps than those articulated in FIGS. 1A-1C.

For example, although not illustrated in FIGS. 1A-1C, the digital video profile system 100 can also remove digital videos from one or more devices. For example, in one or more embodiments, the digital video profile system 100 utilizes the video profile application (downloaded at step 108) on the first client device 102 to capture digital videos. Upon capturing the digital videos and sending the digital videos to the server(s) 104 (e.g., at the step 118), the digital video profile system 100 can remove the digital video from the first client device 102 by deleting the digital video from the video profile application. In this manner, the digital video profile system 100 can automatically (e.g., without user interaction) reduce unnecessary utilization of storage capacity on the first client device 102 when the user does not wish to view the video profile.

Similarly, as discussed above, in providing the video profile to the second client device 106 (at the step 154), the digital video profile system 100 can also provide one or more digital videos to the second client device 106 (e.g., to the video profile application downloaded at step 138). The digital video profile system 100 can also remove the one or more digital videos from the second client device 106. For example, the digital video profile system 100 can remove the digital videos from the second client device 106 upon determining that the second client device 106 has completed viewing the video profile or after passage of an amount of time.

Moreover, in such embodiments that remove digital videos from a client device, when a user wishes to access a video profile and view digital videos, the digital video profile system 100 can temporarily provide corresponding digital videos to a client device. For example, when the user of the first client device 102 seeks to navigate their video profile, the server(s) 104 can temporarily provide the video profile to the first client device 102.

In addition, although not shown in relation to FIGS. 1A-1C, the digital video profile system 100 can also allow users to generate, populate, and share custom video silos. For example, the first client device 102 can generate a custom video silo (i.e., a video silo created by the user of the first client device 102) and capture a digital video corresponding to the custom video silo. The first client device 102 can send the custom video silo to the server(s) 104, and the server(s) 104 can store the custom video silo and corresponding digital video in the video profile corresponding to the first user. The digital video profile system 100 can then allow the second user to access the custom video silo (i.e., either by allowing the second client device 106 to access the video profile of the first user and/or by allowing the first user to send an indication of the custom video silo to the second client device 106). Moreover, the digital video profile system 100 can allow the second user to add the custom video silo to the second video silo structure.

In this manner, the digital video profile system 100 can allow users to create and share custom video silos and modify the video silo structure based on the custom video silos. Moreover, the digital video profile system 100 can also monitor proliferation of custom video silos. For example, the digital video profile system 100 can track the number of users that utilize (e.g., populate) a particular custom video silo. Based on the proliferation of custom video silos among users, the digital video profile system 100 can suggest the custom video silo to other users. For example, based on the proliferation of a custom video silo, the digital video profile system 100 can add the custom video silo to a pre-defined set of video silos utilized by the digital video profile system 100 to add unpopulated video silos to video silo structures.

Additionally, the steps/acts described herein may be performed in a different order, may be repeated or performed in parallel with one another, or may be performed in parallel with different instances of the same or similar steps/acts. For example, although FIGS. 1A-1C illustrate the second client device 106 accessing the video profile of the first user, it will be appreciated that the first client device 102 can also access the video profile corresponding to the second user. Similarly, although FIGS. 1A-1C illustrate the server(s) 104 generating and modifying video silo structures, it will be appreciated that the first client device 102 and/or the second client device 106 can generate and/or modify video silo structures (e.g., modify a video silo structure in response to a captured digital video).

In addition, although FIGS. 1A-1C illustrate the various steps in a particular sequence, each of the steps can be performed in a different order within the method. For instance, the digital video profile system 100 can perform steps 110-114 after receiving a digital video (at step 118). Indeed, in one or more embodiments, the digital video profile system 100 generates a video profile and provides a video silo structure after receiving a number of pre-determined digital videos (e.g., three) from the first client device 102.

As discussed above, in one or more embodiments, the digital video profile system 100 provides one or more user interfaces for generating a video profile. In particular, the digital video profile system 100 can provide one or more user interfaces for populating unpopulated video silos and capturing digital videos. FIGS. 2A-2E illustrate user interfaces for providing notifications to a client device to capture digital videos corresponding to unpopulated video silos in accordance with one or more embodiments.

Figure 2B:
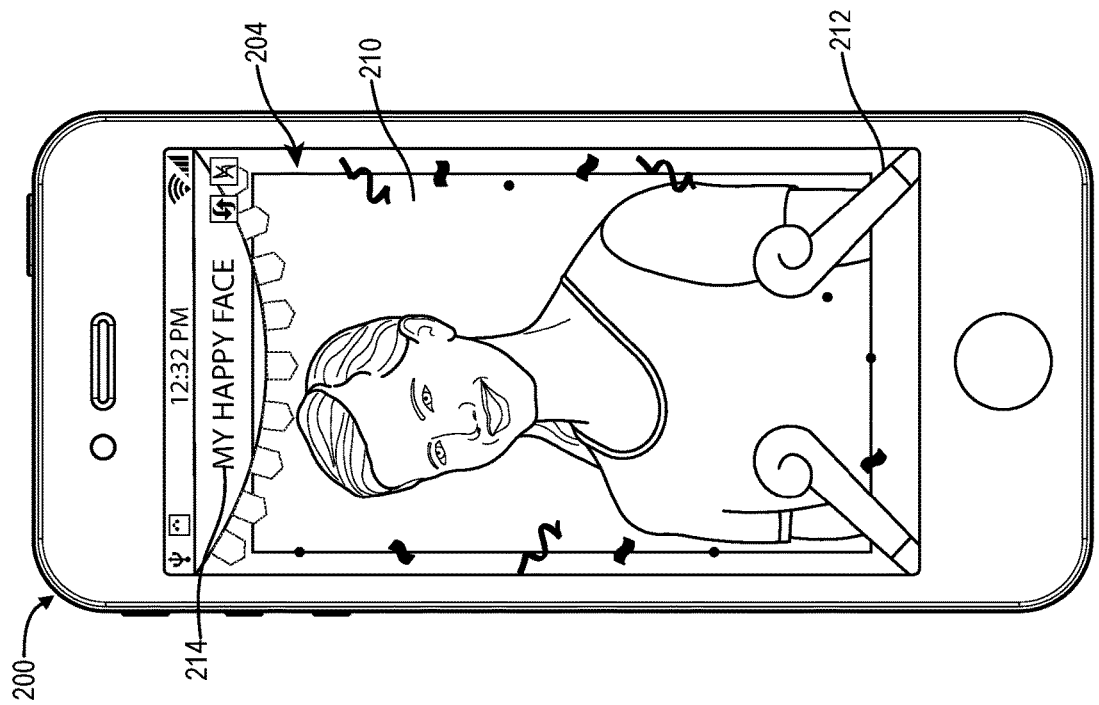
Figure 2A:
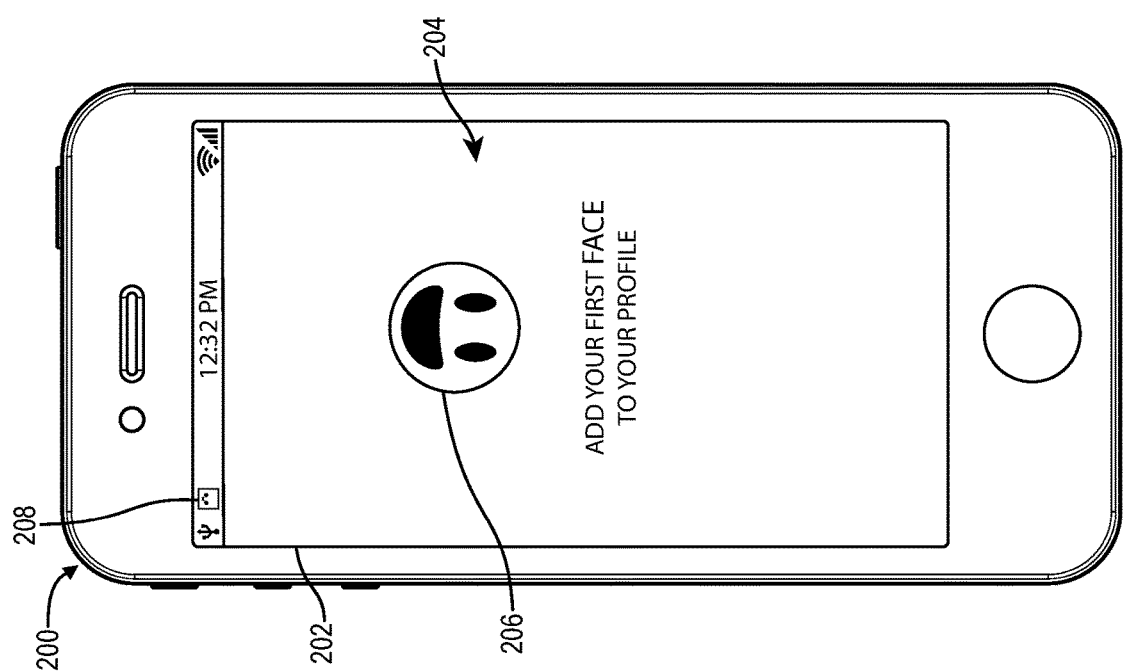

In particular, FIG. 2A illustrates a computing device 200 with a touchscreen 202 displaying a user interface 204 corresponding to a video profile application 208. As shown, the user interface 204 includes a first notification 206 to add a digital video to a video profile. In particular, the first notification 206 prompts a user to capture a digital video of a face for the video profile. Upon user interaction with the first notification 206 (e.g., a touch event corresponding to the first notification 206), the digital video profile system can modify the user interface 204 to provide additional elements for capturing a digital video corresponding to an unpopulated video silo.

For example, FIG. 2B illustrates the user interface 204 upon user interaction with the first notification 206. The user interface 204 of FIG. 2B includes a video capture element 210, an overlay element 212, and a topic element 214. The user can utilize the user interface 204 (and the video profile application 208) to capture a digital video corresponding to an unpopulated video silo (i.e., a video silo corresponding to the topic, "My Happy Face").

The video capture element 210 provides an area of the graphical user interface with which a user can interact to capture and/or preview a digital video captured by a camera device of the computing device 200. Accordingly, a user can utilize the video capture element 210 to initiate a recording of a digital video, select a stored digital video, view an example digital video, preview a captured/selected digital video, and/or populate a video silo with a digital video. Moreover, the overlay element 212 and the topic element 214 provide a visual indication of a topic, category, and/or a description associated with (or to be associated with) the corresponding digital video and video silo. Specifically, the overlay element 212 and the topic element 214 can reflect a topic of the video silo. For example, the overlay element 212 can include one or more graphics, borders, and/or animations that give a visual indication of a topic, a category, or other information associated with the corresponding video silo. As a further example, the topic element 214 can include text comprising a name of or topic for the corresponding video silo. In further embodiments, the overlay element 212 and/or topic element 214 can include any other information or visual features associated with the video silo.

For example, upon user interaction with the user interface 204 (e.g., pressing and holding within the video capture element 210), the digital video profile system 100 can capture (via the computing device 200) a digital video. Moreover, the digital video profile system 100 can associate the captured digital video with an unpopulated video silo corresponding to the overlay element 212 and the topic element 214. Specifically, the digital video profile system 100 can associate the captured digital video with a video silo corresponding to a topic of "My Happy Face" (i.e., a "My Happy Face" video silo).

Figure 2D:
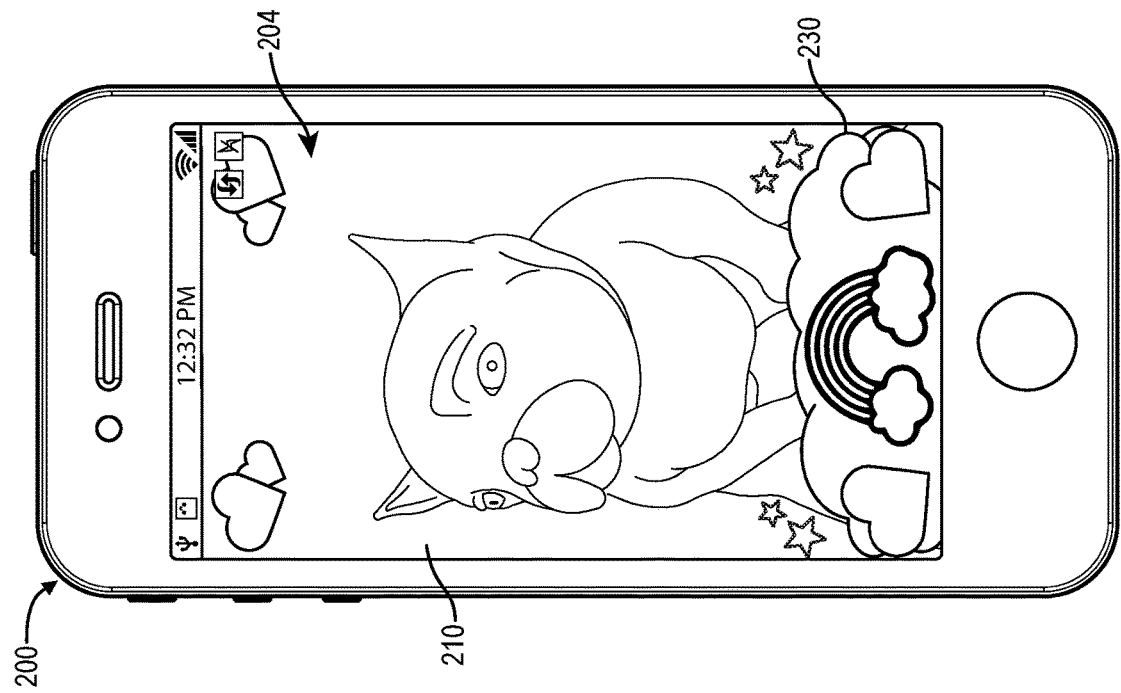
Figure 2C:
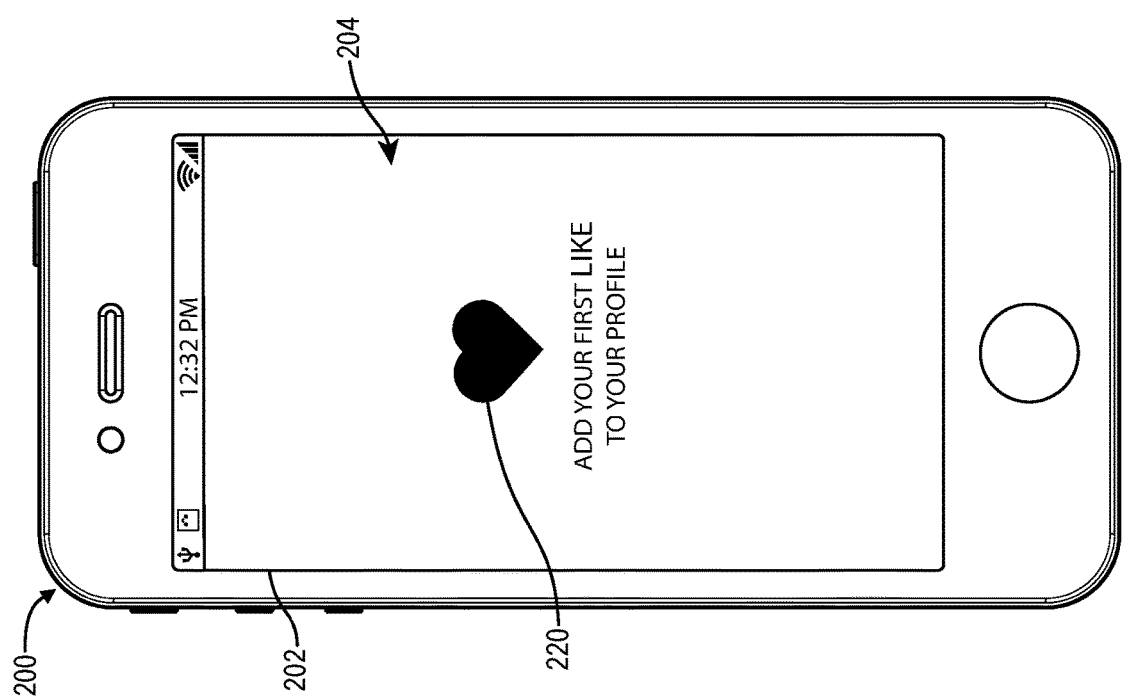

As mentioned, in one or more embodiments, the digital video profile system 100 captures a plurality of digital videos corresponding to unpopulated video silos. FIGS. 2C-2E illustrate additional elements in the user interface 204 for capturing additional digital videos corresponding to additional unpopulated video silos. For example, FIG. 2C illustrates the user interface 204 with a second notification 220 (i.e., a notification to capture a digital video corresponding to a "Like" video silo). Similarly, FIG. 2D illustrates the user interface 204 with the video capture element 210 and a second overlay 230 corresponding to a second unpopulated video silo (i.e., the "Like" video silo). Furthermore, FIG. 2E illustrates the user interface 204 with a third notification 240 (i.e., a notification to capture a digital video corresponding to a "Dislike" video silo).

In one or more embodiments, the digital video profile system 100 provides the three notifications 206, 220, and 240 and waits until the computing device 200 has captured corresponding digital videos prior to providing a video silo structure for display via the computing device 200. In other embodiments, the digital video profile system 100 provides a video silo structure for display at another time (e.g., upon launching a video profile application or upon selection of a user interface element operable to display the video silo structure).

As just mentioned, in one or more embodiments, the digital video profile system 100 enables and/or creates a video silo structure for a user profile and provides the video silo structure for display on a client device associated with the user. In particular, the digital video profile system 100 can select video silos, generate a video silo structure, and provide the video silo structure for display to a client device. FIGS. 3A-3B illustrates a user interface for providing a video silo structure for display in accordance with one or more embodiments.

In particular, FIG. 3A illustrates the computing device 200 with the user interface 204. The user interface 204 includes a video silo structure display area 308 that includes a plurality of categories and video silos. In particular, the video silo structure display area 308 includes a plurality of categories 304a-304n and a plurality of video silos 306a, 306b (or "fields"). The categories 304a-304n each contain one or more corresponding video silos (and/or sub-categories) where the video silos 306a, 306b do not contain additional video silos.

As shown, the categories 304a-304n include unpopulated video silo number indicators that reflect the number of unpopulated video silos corresponding to a particular category. For example, the categories 304a (i.e., "Faces") has an unpopulated video silo number indicator 302. The unpopulated video silo number indicator 302 denotes that the category 304a includes two unpopulated video silos.

Upon user interaction with the categories 304a-304n, the digital video profile system 100 can provide additional indicators corresponding to the video silos within each category. For example, FIG. 3B illustrates the user interface 204 upon user interaction (e.g., a press and release event) with the category 304a and the category 304b. As shown, the video silo structure display area 308 in FIG. 3B includes video silos 306c, 306d, 306e under the category 304a and video silos 306f, 306g under the category 304b. In particular, the video silos 306c, 306d, 306e ("My Angry Face," "My Happy Face," and "My Sad Face") correspond to the category 304a (i.e., the category of "Faces") and the video silos 306f, 306g ("My Classroom" and "My Locker") correspond to the category 304b (i.e., the category of "School").

Notably, the video silos 306c-306g also provide a visual indication as to whether the video silo is populated. In particular, the video silo structure display area 308 includes an unpopulated icon 310 corresponding to the video silo 306c to indicate that the "My Angry Face" video silo 306c is unpopulated. In contrast, the video silo 306d does not include an unpopulated icon, because the "My Happy Face" video silo is already populated (e.g., as described in relation to FIGS. 2A-2B).

Although the video silo 306d does not include an unpopulated icon, it will be appreciated that the video silo 306d can be re-populated or de-populated. For example, the digital video profile system 100 can replace a digital video corresponding to a video silo (e.g., a user can select the video silo 306*d* and capture a new digital video to replace the existing digital video corresponding to the video silo 306*d*). Similarly, the digital video profile system 100 can delete a digital video corresponding to a video silo (e.g., a user can select the video silo 306*d* and delete the existing digital video corresponding to the video silo 306*d*, thus making the video silo 306*d* unpopulated once again).

As mentioned previously, in one or more embodiments, the digital video profile system 100 generates a video silo structure (e.g., the video silo structure portrayed in the video silo structure display area 308). In particular, the digital video profile system 100 can generate a video silo structure by selecting a plurality of video silos and arranging the video silos into categories. More specifically, in one or more embodiments, the digital video profile system 100 selects a plurality of video silos from a pre-defined set of video silos and arranges the selected video silos into categories.

Indeed, in one or more embodiments, the digital video profile system 100 maintains a pre-defined set of video silos. The pre-defined set of video silos can define topics corresponding to each video silo as well as one or more categories corresponding to each video silo. For example, the digital video profile system 100 can define a video silo corresponding to the topic "My Happy Face" and assign a category to the video silo, such as "Faces" or "What Makes Me Happy." The digital video profile system 100 can then utilize the pre-defined set of video silos to select unpopulated video silos and build a video silo structure.

The digital video profile system 100 can select video silos (and/or new categories) based on a variety of factors. For example, in one or more embodiments, the digital video profile system 100 selects unpopulated video silos based on user information. To illustrate, the digital video profile system 100 can select unpopulated video silos based on a user's location, language, community (e.g., a school that a user attends), purchase history, demographic information, interests, or contacts (e.g., connections or friends). Moreover, the digital video profile system 100 can select unpopulated video silos based on nodes information and edge information corresponding to a social networking system (e.g., node information and edge information indicating preferences, interests, or other information regarding a user).

For example, in one or more embodiments, the digital video profile system 100 determines that a user is interested in sports. In response, the digital video profile system 100 can select one or more video silos corresponding to sports (e.g., "Touchdown Dance" video silo or "Game Face" video silo).

In one or more embodiments, the digital video profile system 100 selects unpopulated video silos based on video silos utilized by other users. For example, the digital video profile system 100 can determine that users in a particular region repeatedly populate a first video silo (or repeatedly utilize a particular category). The digital video profile system 100 can detect that a new user is located in the particular location and select the first video silo (or a particular category) based on the determination that other users in the particular region repeatedly populate the first video silo (or repeatedly utilize the particular category).

Upon selecting video silos, the digital video profile system 100 can also organize the video silos into categories. For example, as mentioned, in one or more embodiments, the digital video profile system 100 selects video silos from a pre-determined set of video silos, where each video silo is associated with one or more categories. Upon selecting video silos, the digital video profile system 100 can arrange the video silos based on the associated categories. To illustrate, the digital video profile system 100 can select the "My Angry Face" and "My Sad Face" video silos and arrange the video silos under the category of "Faces."

In one or more embodiments, rather than select individualized video silos, the digital video profile system 100 selects a determined set of unpopulated video silos. For example, in one or more embodiments, the digital video profile system 100 provides the same initial video silo structure to each user. In this manner, one or more embodiments of the digital video profile system 100 provide a uniform video silo structure at the outset that is individualized and modified over time as a user utilizes the digital video profile system 100 to populate unpopulated video silos.

Figure 4B:
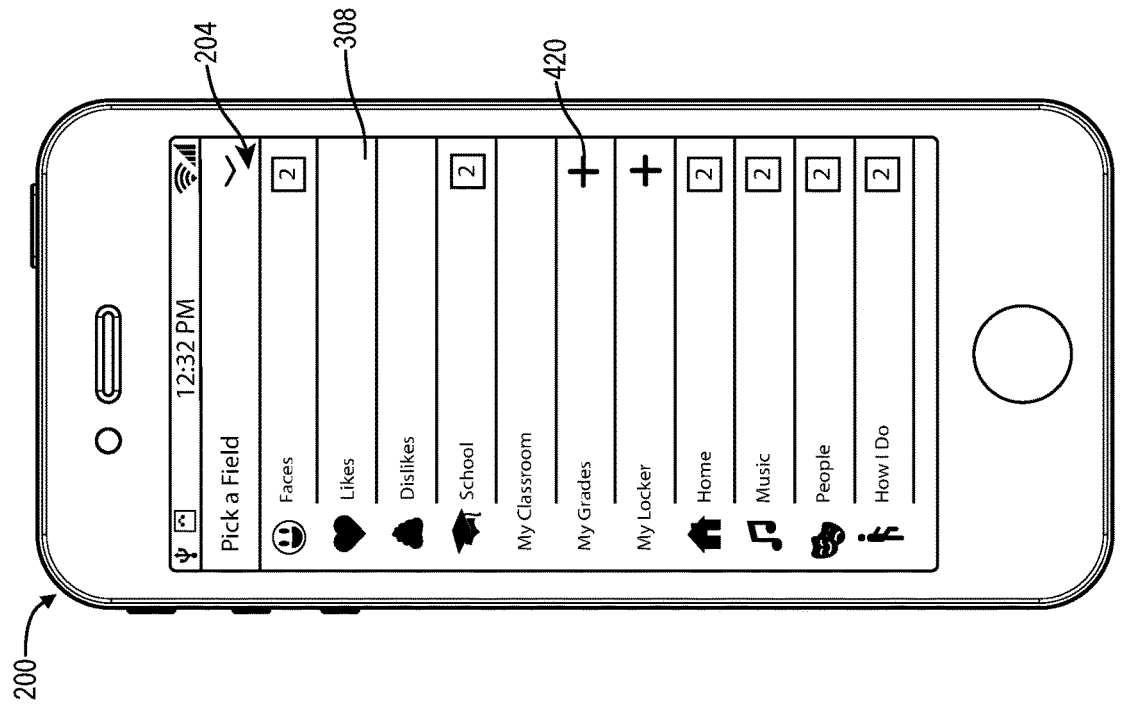
FIGS. 4A-4B illustrate a computing device and user interface displaying capturing a digital video and modifying a video silo structure in accordance with one or more embodiments.

As mentioned previously, in one or more embodiments, the digital video profile system 100 captures digital videos and associates the digital videos with video silos. Moreover, in response to a captured digital video, the digital video profile system 100 can then modify a video silo structure. For example, FIGS. 4A-4B illustrate capturing a digital video corresponding to a video silo and modifying a video silo structure based on the captured digital video.

Figure 4A:
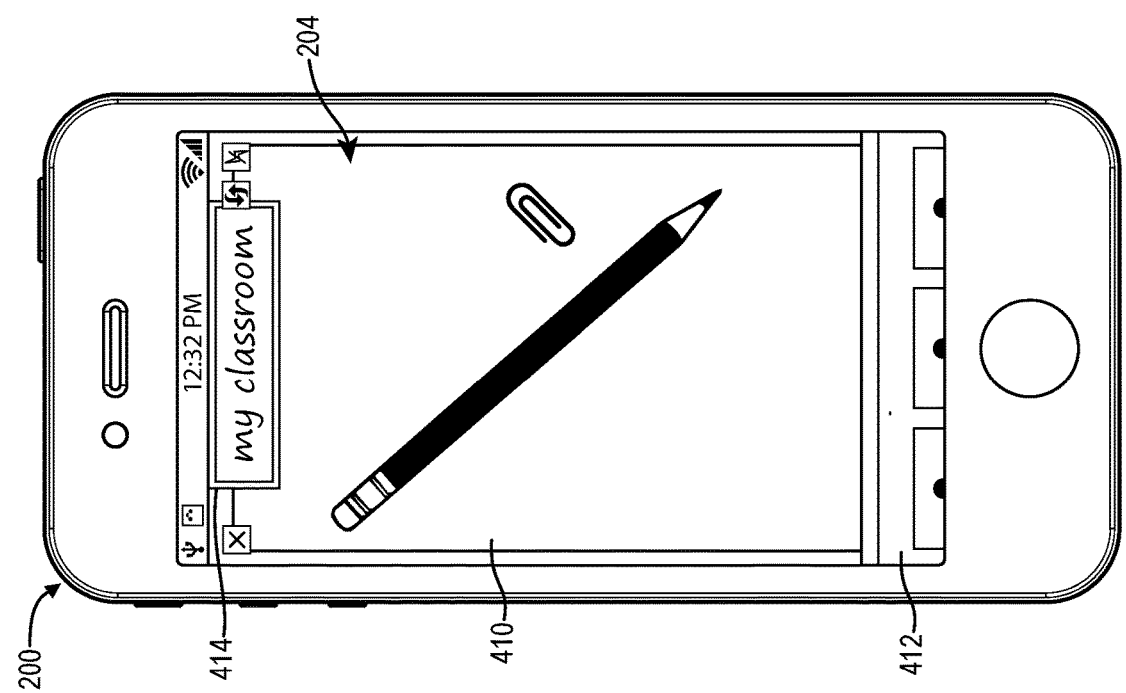

Specifically, FIG. 4A illustrates the computing device 200 with the user interface 204 including a video capture element 410, an overlay element 412, and a topic element 414. In particular, FIG. 4A illustrates the computing device 200 upon selection of the "My Classroom" video silo 306*f* under the "School" category 304*b*. As shown in FIG. 4A, the computing device 200 can capture a digital video corresponding to the "My Classroom" video silo 306*f* based on user interaction with the video capture element 410. For example, a user can press, hold, and release the video capture element 410 to capture a digital video corresponding to the "My Classroom" video silo 306*f* (e.g., press event to start recording a digital video, release event to end recording).

It will be appreciated that a video silo can be associated with one or more digital videos. In the foregoing example, each video silo can be populated with only a single digital video. However, in other embodiments, all (or a subset) of digital silos can be populated with more than one digital video. For example, in one or more embodiments, the digital video profile system 100 allows the "Likes" and/or "Dislikes" to be populated with any number of digital videos, while all other video silos are limited to a single digital video.

Upon capturing the digital video corresponding to the "My Classroom" video silo 306*f*, the digital video profile system 100 modifies the video silo structure. For example, FIG. 4B illustrates the video silo structure after capturing the digital video corresponding to the "My Classroom" video silo 306*f*. In particular, FIG. 4B illustrates the user interface 204 with the video silo structure display area 308. As shown, the video silo structure display area 308 now includes a new unpopulated "My Grades" video silo 420 under the "School" category 304*b*.

The digital video profile system 100 modifies the video silo structure to include the "My Grades" video silo 420 based on the user capturing a digital video corresponding to the "My Classroom" video silo 306*f*. In particular, the digital video profile system 100 detects that the "My Classroom" video silo 306*f* corresponds to the "School" category 304*b* and selects a new unpopulated video silo based on the "School" category. Specifically, the digital video profile system 100 identifies and selects an unpopulated video silo from a pre-defined set of video silos that correspond to the "School" category.

Although the embodiment of FIG. 4B illustrates modifying a video silo structure by adding a new video silo, it will be appreciated that the digital video profile system 100 can modify a video silo in a variety of ways. For example, in addition to adding an unpopulated video silo, the digital video profile system 100 can also add a category (e.g., add a new unpopulated video silo corresponding to a new category), remove a video silo (e.g., identify that a user is disinterested in a particular video silo and remove the video silo from the video silo structure), or remove a category. Moreover, the digital video profile system 100 can also add and/or remove a plurality of video silos and/or categories. For example, rather than adding a single video silo, the digital video profile system 100 can add a plurality of new video silos within a single category or across multiple categories.

The digital video profile system 100 can select a modification to a video silo structure based on a variety of factors. For example, the digital video profile system 100 can determine a modification based on the number of video silos populated (e.g., provide more video silos for users that have populated a large number of video silos), the frequency of populating video silos (e.g., provide more video silos for users that frequently populate video silos), or the category of video silos populated (e.g., delete a category or video silo that a user has failed to utilize after a particular period of time or after a particular number of captured digital videos or add a new category with a new video silo after the user populates a video silo from a large number of other categories).

In addition, it will be appreciated that the digital video profile system 100 can also modify a video silo structure based on user input. For example, in one or more embodiments, a user can provide user input for deleting a video silo (e.g., swipe a video silo to delete the video silo). In response, the digital video profile system 100 can remove the video silo from the video silo structure. Similarly, as discussed in greater detail below, the digital video profile system 100 can also add a custom video silo based on user input.

Furthermore, although the embodiment of FIG. 4B shows a selection of a video silo based on a particular factor (e.g., based on a category corresponding to the populated video silo), the digital video profile system 100 can consider a variety of factors in selecting new unpopulated video silos. For example, in addition to the category of the most recently populated video silo, the digital video profile system 100 can select a new unpopulated video silo based on user information (e.g., select a video silo corresponding to children for a married user with children), interests or conduct of the user (e.g., select a video silo corresponding to music based on a determination that a user likes to attend concerts), utilization of video silos of other community members (e.g., select a video silo that is popular in a particular user's school), location, language, device type, date and/or time, a social graph, a number of unpopulated video silos (e.g., select a video silo corresponding to a category that has a small number of unpopulated video silos), or a number of populated video silos (e.g., select a video silo corresponding to a category that the user has repeatedly utilized).

As mentioned above, the digital video profile system 100 can also provide user interfaces for navigating a video profile (e.g., digital videos corresponding to populated video silos in a video profile). For example, FIGS. 5A-5E illustrate a user interface for navigating a video profile in accordance with one or more embodiments.

Figure 5B:
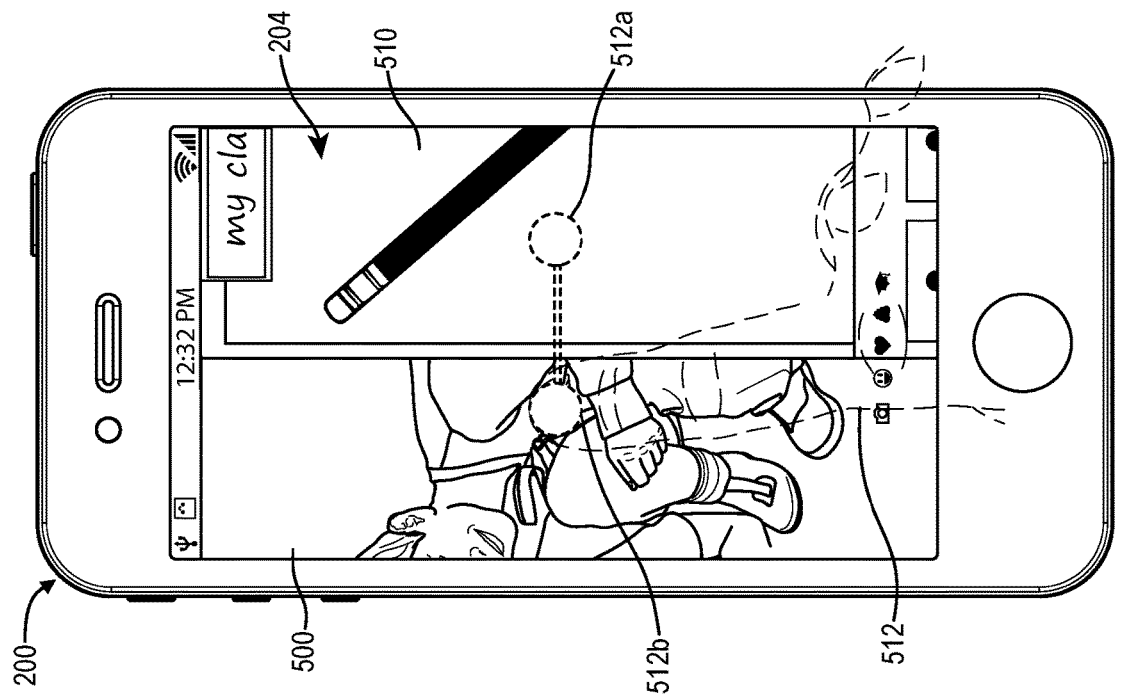
FIGS. 5A-5E illustrate a computing device and user interface for navigating digital videos arranged in a video silo structure in accordance with one or more embodiments.
Figure 5A:
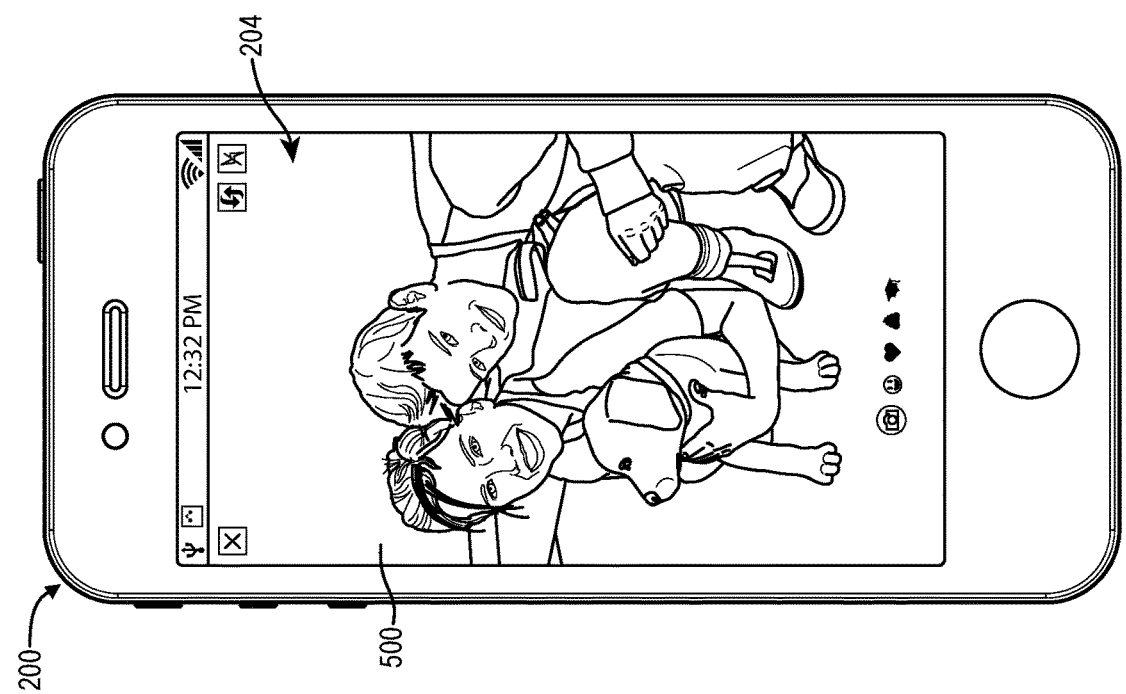

In particular, FIG. 5A illustrates the computing device 200 with the user interface 204, which includes a video capture element 500. As discussed previously, the video capture element 500 provides an area of the graphical user interface with which a user can interact to capture and/or preview a digital video captured by a camera device of the computing device 200. Unlike the video capture element 410 of FIG. 4B, the video capture element 500 does not contain an overly element corresponding to a particular video silo. A user can utilize the video capture element 500 to capture a digital video and then (after capturing the digital video) assign the captured digital video to a video silo.

As mentioned, the digital video profile system 100 allows a user to navigate from the video capture element 500 to digital videos within a video profile. For example, FIG. 5B illustrates a first user interaction that causes the digital video profile system 100 to transition the user interface 204 from including the video capture element 500 to including a video replay element 510 corresponding to a previously captured digital video. Specifically, FIG. 5B illustrates a finger 512 performing a press event at a first location 512a, a drag event, and a release event at a second location 512b (i.e., a swipe gesture).

Figure 5D:
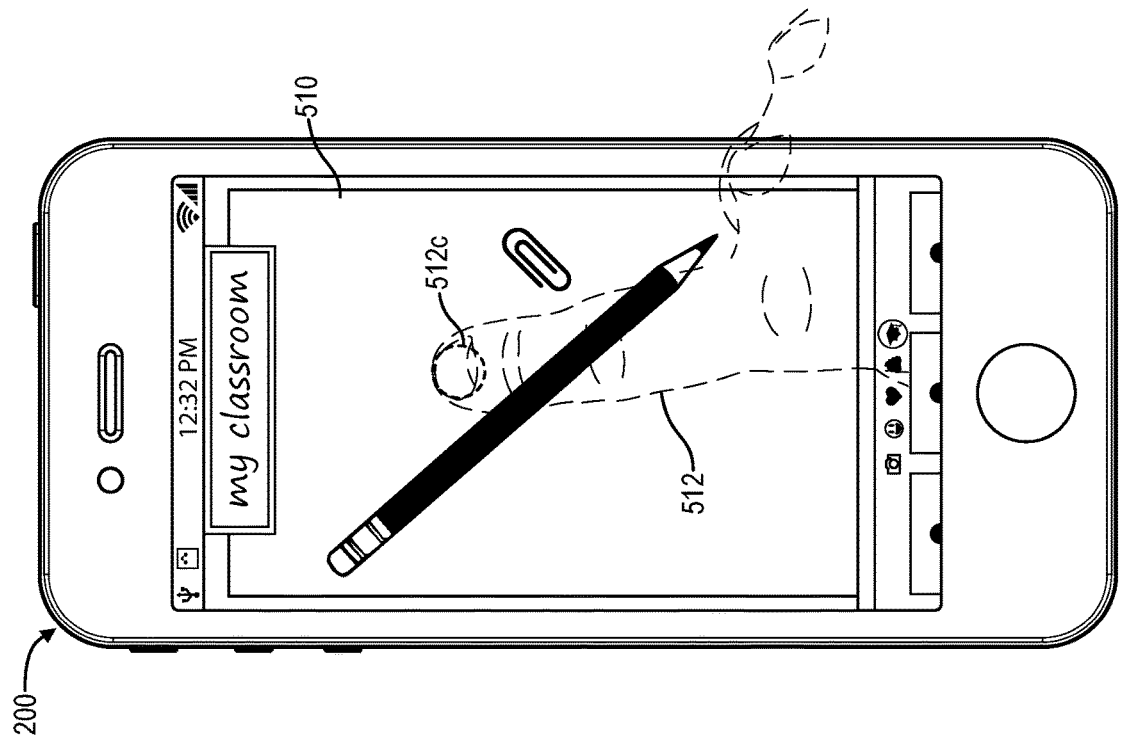
Figure 5C:
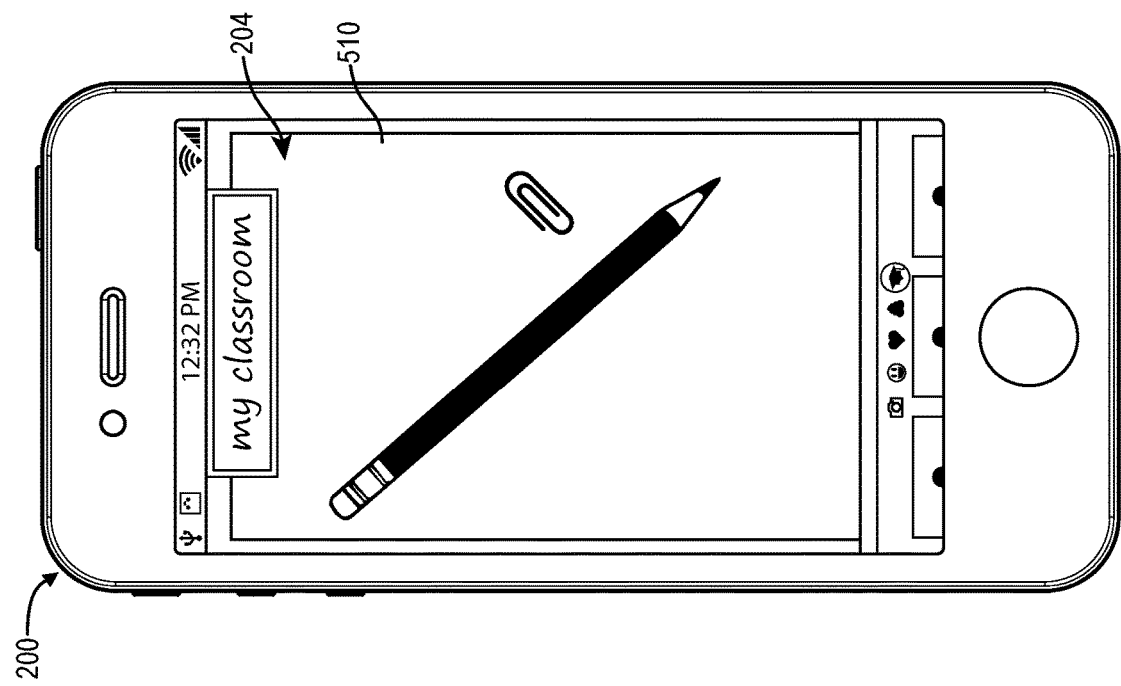

As shown in FIG. 5C, in response to the swipe gesture the digital video profile system 100 transitions the user interface 204 from displaying the video capture element 500 to the video replay element 510, which corresponds to the "My Classroom" video silo 306f The video replay element 510 provides an area of the graphical user interface to display, provide, review, and/or replay digital videos (e.g., digital videos captured or stored by the digital video profile system 100). Specifically, in relation to FIG. 5C, the video replay element 510 displays the digital video assigned to the "My Classroom" video silo 306f

In one or more embodiments, the digital video profile system 100 transitions through the video profile in a particular order in response to a particular user interaction. For example, in relation to the embodiment of FIG. 5A, the digital video profile system 100 transitions from the video capture element 500 to the category most recently populated with a digital video. Repeating the user interaction (e.g., the select, drag, and drop) navigates to the next category most recently populated with a digital video.

In other embodiments, the digital video profile system 100 transitions in a different order. For example, in one or more embodiments, the digital video profile system 100 transitions from the video capture element 500 to the next category with a populated video silo in the video silo structure (e.g., to "My Happy Face" video silo 306d). Repeating the user interaction (e.g., the swipe gesture) navigates to the next category (or the next video silo outside of the current category) in the video silo structure (e.g., the "Likes" video silo 306a).

Figure 5E:
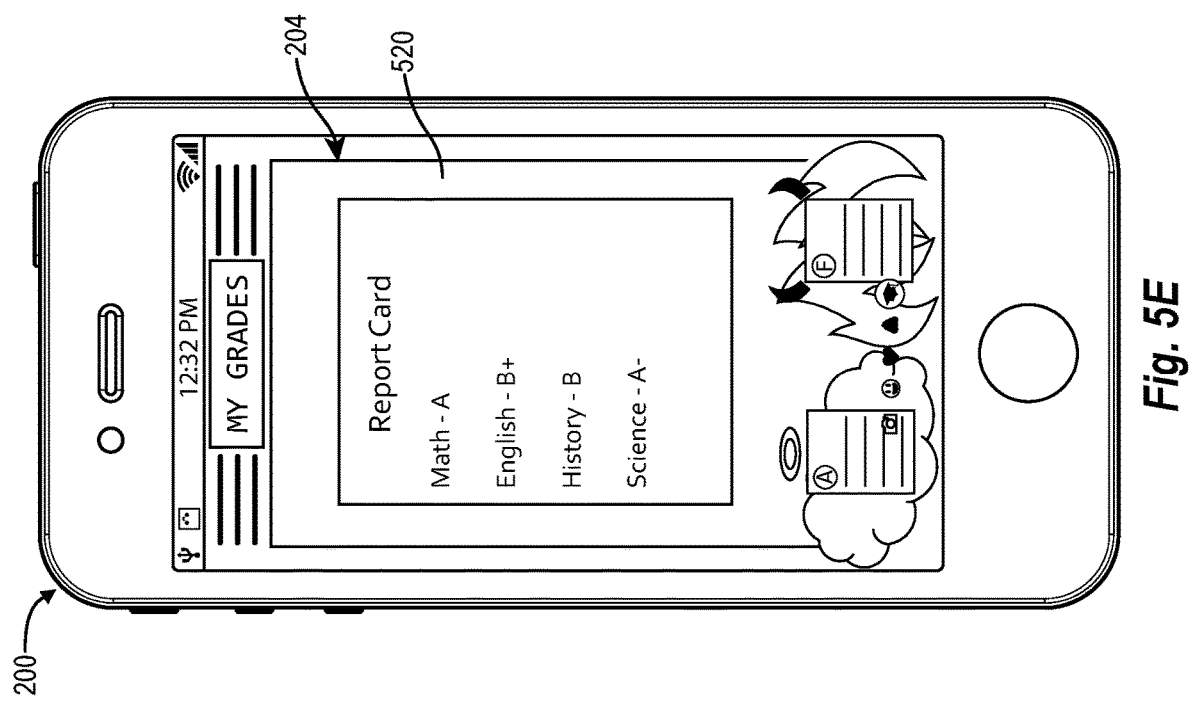

The digital video profile system 100 can also utilize other user interactions to navigate through the video profile in a different manner. For example, FIG. 5D illustrates navigating through a video profile utilizing a second user interaction. In particular, FIG. 5D illustrates the finger 512 performing a press event and release event at the location 512c (i.e., a tap gesture). As shown in FIG. 5E, in response to the tap gesture, the digital video profile system 100 transitions from the video replay element 510 corresponding to the "My Classroom" video silo 306f to the next populated video silo within the current category of the video silo structure (e.g., the next populated video silo in the "School" category 304*b*).

Specifically, in relation to the embodiment of FIGS. 5D-5E the next populated video silo within the "School" category 304*b* is a "My Grades" video silo (not illustrated in FIG. 3B, but subsequently added to the video silo structure). Thus, as shown in FIG. 5E, the user interface 204 includes a video replay element 520 corresponding to a captured digital video associated with the "My Grades" video silo.

Furthermore, in response to another press and release event, the user interface 204 can provide a video replay element corresponding the next digital video in the "School" category (or upon reaching the end of the "School" category, moving on to the beginning of the next category in the video silo structure). In this manner, the digital video profile system 100 navigate through a video profile. For example, a user can swipe to new categories of video silos and tap to proceed through video silos within particular categories.

Figure 6B:
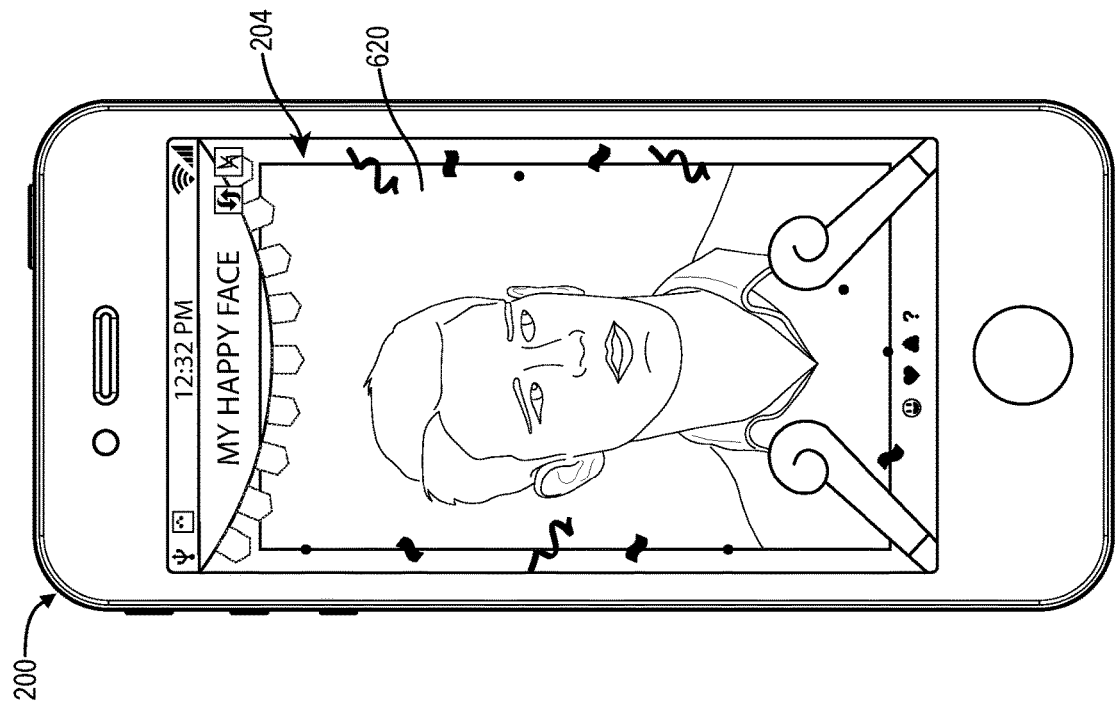
FIGS. 6A-6E illustrate a computing device and user interface for displaying and navigating a video profile of another user in accordance with one or more embodiments.
Figure 6A:
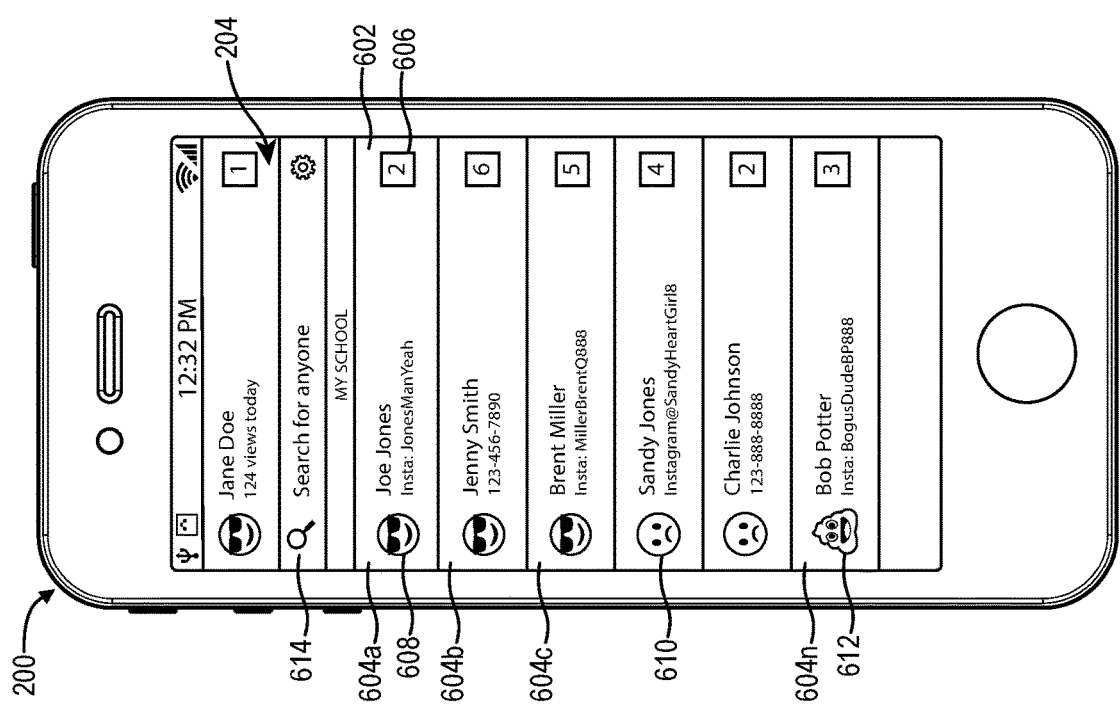

In addition to navigating video profiles, the digital video profile system 100 can also allow a user to search for, navigate, and provide video profiles of other users for display to a client device. For example, FIGS. 6A-6E illustrate displaying and navigating through video profiles of other users. In particular, FIG. 6A illustrates the computing device 200 with the user interface 204 including a video profile list area 602 comprising a plurality of video profile indicators 604*a*-604*n*. Each video profile indicator 604*a*-604*n* corresponds to a video profile of another user of the digital video profile system 100.

In providing a list of video profiles (or users), the digital video profile system 100 can provide a variety of information for display. For example, as illustrated in FIG. 6A, the plurality of video profiles indicators 604*a*-604*n* each include a total activity indicator and a recent activity indicator. For example, the video profile indicator 604*a* includes a total activity indicator 606 (i.e., "2") that reflects the number of digital videos that have been associated with video profiles.

The digital video profile system 100 can calculate a measure of total activity (e.g., a value corresponding to a total activity indicator) in a number of ways. For example, in one or more embodiments, the digital video profile system 100 calculates the total activity indicator as the number of populated video silos in a user's video profile. Similarly, in one or more embodiments, the digital video profile system 100 calculates the total activity indicator based on the number of categories with a populated video silo. Similarly, in one or more embodiments, the digital video profile system 100 calculates the total activity indicator based on the number of categories with a particular number of populated video silos (e.g., two categories have at least three populated video silos).

In addition, as shown in FIG. 6A, the video profile indicator 604*a* also includes the recent activity indicator 608. The recent activity indicator 608 reflects an amount of recent activity by the user corresponding to the video profile. In relation to FIG. 6A, the digital video profile system 100 generates the recent activity indicator 608 based on the amount of time since a digital video was added to a video profile. For example, the digital video profile system 100 generates the recent activity indicator 608 (i.e., smiling sunglasses emoji) based on a determination that a user of the corresponding video profile has populated a video silo with a digital video within a particular time period (e.g., the past three days).

Similarly, the digital video profile system 100 can generate other recent activity indicators based on a determination that a user last populated a video silo in a different time period. For example, the digital video profile system 100 generates the recent activity indicator 610 (i.e., frowning face emoji) based on a determination that a user of the corresponding video profile last populated a video silo in a second period of time (e.g., longer than three days, but less than a week). Similarly, the digital video profile system 100 generates the recent activity indicator 612 based on a determination that a user of the corresponding video profile last populated a video silo in a third period of time (e.g., longer than a week).

It will be appreciated that the digital video profile system 100 can generate a recent activity indicator based on a variety of factors. For example, in addition to time, the digital video profile system 100 can also consider a number of populated video silos in generating a recent activity indicator. For example, the digital video profile system 100 can select a first indicator based on a determination that a user has populated at least three video silos in the past three days. Moreover, the digital video profile system 100 can select a second indicator based on a determination that a user has only populated two video silos in the past three days.

As shown in FIG. 6A, the digital video profile system 100 can also arrange video profile indicators in a particular order. For example, in relation to FIG. 6A the digital video profile system 100 arranges the video profile indicators 604*a*-604*n* based on the last time that a user updated a video profile (e.g., added a digital video to the video profile). The digital video profile system 100 can arrange video profile indicators based on a variety of additional factors. For example, the digital video profile system 100 can arrange video profile indicators based on location (e.g., proximity to a user of the computing device 200), based on other users belonging to a particular community (e.g., belonging to the same school as the user or some other organization), or based on a measure of interest of the user (e.g., based on a user checking the video profile of another user more frequently or more often than other users or based on a determined relationship between users).

The digital video profile system 100 can also limit video profiles to provide for display via the video profile list area 602. For example, the digital video profile system 100 can limit the video profile list area 602 to other users that belong to the same community (e.g., same school or some organization), to other users that have provided permission to view their video profile (e.g., friends or other connections), to other users belonging to a participating community (e.g., users belonging to a school with a qualified number of users, as described below in relation to FIG. 8C), or to other users sharing particular characteristics (e.g., users within a particular distance or in the same location).

As shown in FIG. 6A, the digital video profile system 100 can also provide other information in providing a list of video profiles. For example, the digital video profile system 100 can provide contact information (e.g., phone numbers, instant messaging identifiers, or e-mail addresses) or the number of views a particular video profile has received (e.g., ten views in the past day).

In addition, the digital video profile system 100 can also search for video profiles (or users). For example, as shown in FIG. 6A, the user interface 204 includes a search element 614. A user can enter a search query (e.g., a user's name or identifier) and the digital video profile system 100 can conduct a search based on the search query. For example, the digital video profile system 100 can conduct a search for other users within a database of users maintained by the digital video profile system 100 and provide results of the search for display.

As mentioned previously, in addition to providing a list of video profiles, the digital video profile system 100 can also allow users to view and navigate through the video profiles of other users. For example, FIG. 6B illustrates the computing device 200 and the user interface 204 displaying a digital video 620 corresponding to a video silo of a second user's video profile (i.e., a digital video from the "Joe Jones" video profile). In particular, FIG. 6B illustrates the user interface 204 upon selection of the video profile indicator 604a.

The digital video profile system 100 can provide digital videos in a particular order or arrangement. For example, in relation to FIG. 6B, the digital video profile system 100 provides digital videos based on a video silo structure corresponding to the video profile of the second user. To illustrate, the "My Happy Face" video silo is the first video silo in the video silo structure of the second user. Accordingly, in relation to the embodiment of FIG. 6B, the digital video profile system 100 provides the "My Happy Face" video silo and corresponding digital video for display via the user interface 204.

The digital video profile system 100 can also provide digital videos in other orders or arrangements. For example, the digital video profile system 100 can provide digital videos in order of time (e.g., most recent digital videos first) or in order of interest (e.g., most viewed digital videos first).

As discussed above, the digital video profile system 100 can also allow users to navigate through the video profile of other users. For example, in response to a first user interaction (e.g., a swipe gesture) the digital video profile system 100 can navigate between categories of video silos and present digital videos for display. Similarly, in response to a second user interaction (e.g., a tap gesture), the digital video profile system 100 can navigate to the next video silo in the video silo structure (e.g., within the same category of the video silo structure).

As mentioned previously, a user can also modify a video silo structure based on user interaction with the video profile of another user. For example, FIG. 6C illustrates the user interface 204 displaying a digital video 630 corresponding to a "When I'm In Trouble" video silo from the video silo structure of the second user (i.e., "Joe Jones"). In particular, upon user interaction with the digital video 620, the digital video profile system 100 provides the digital video 630 for display.

Notably, the "When I'm In Trouble" video silo does not appear in the video silo structure of the first user. Rather, the second user (i.e., "Joe Jones") has unlocked the "When I'm In Trouble" video silo, whereas the first user has not. The first user can add the "When I'm In Trouble" video silo to the video silo structure corresponding to the first user based on user interaction with the "When I'm In Trouble" video silo from the second user's video profile.

For example, FIG. 6C illustrates a finger 632 performing a long touch event (e.g., a touch event that extends beyond a particular amount of time). Based on the long touch event corresponding to the "When I'm In Trouble" video silo from the video profile of the second user, the digital video profile system 100 adds the "When I'm In Trouble" video silo to the video silo structure of the first user.

Figure 6D:
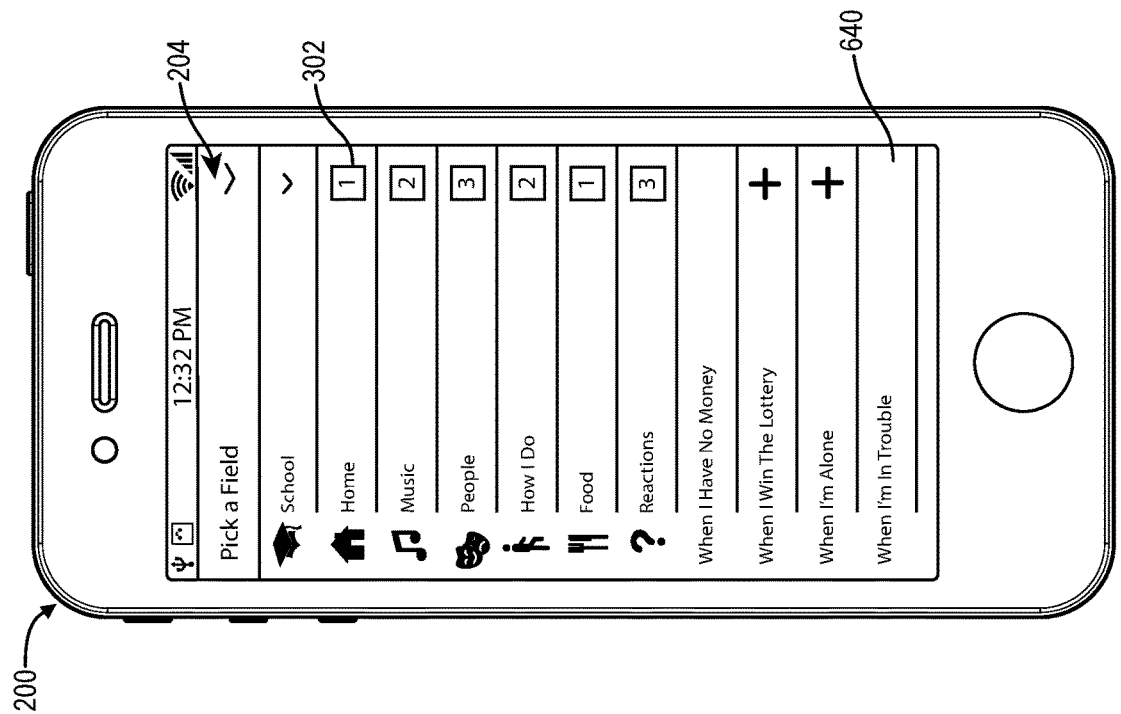
Figure 6C:
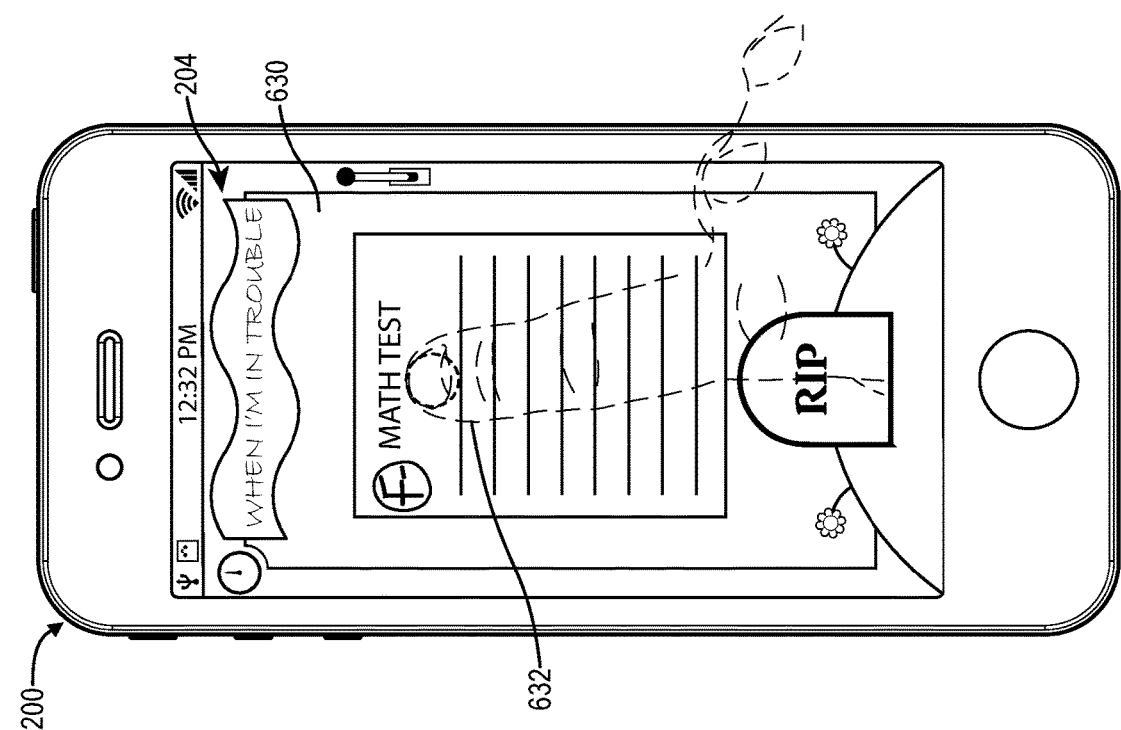

Indeed, FIG. 6D shows the computing device 200 with the user interface 204 displaying the video silo structure display area 308. As shown, in response to the long touch event, the digital video profile system 100 adds the "When I'm In Trouble" video silo 640 to the video silo structure display area 308. Accordingly, the user can now add a digital video to the "When I'm In Trouble" video silo 640 (e.g., by selecting the "When I'm In Trouble" video silo from the second user's video profile and capturing a corresponding digital video).

In addition to an express selection (e.g., long touch event) of a video silo in another user's video profile, the digital video profile system 100 can also monitor user interaction with other users' video profiles and select video silos based on the monitored user interactions. For example, the digital video profile system 100 can monitor user interaction with other video profiles and determine that the user frequently watches digital videos corresponding to a particular category (e.g., "Food"). In response, the digital video profile system 100 can select a digital video corresponding to the particular category to add the users video silo structure (e.g., add video silos from the "Food" category). In this manner, the digital video profile system 100 can modify video silo structures based on user interaction with the video profiles of other users.

Figure 6E:
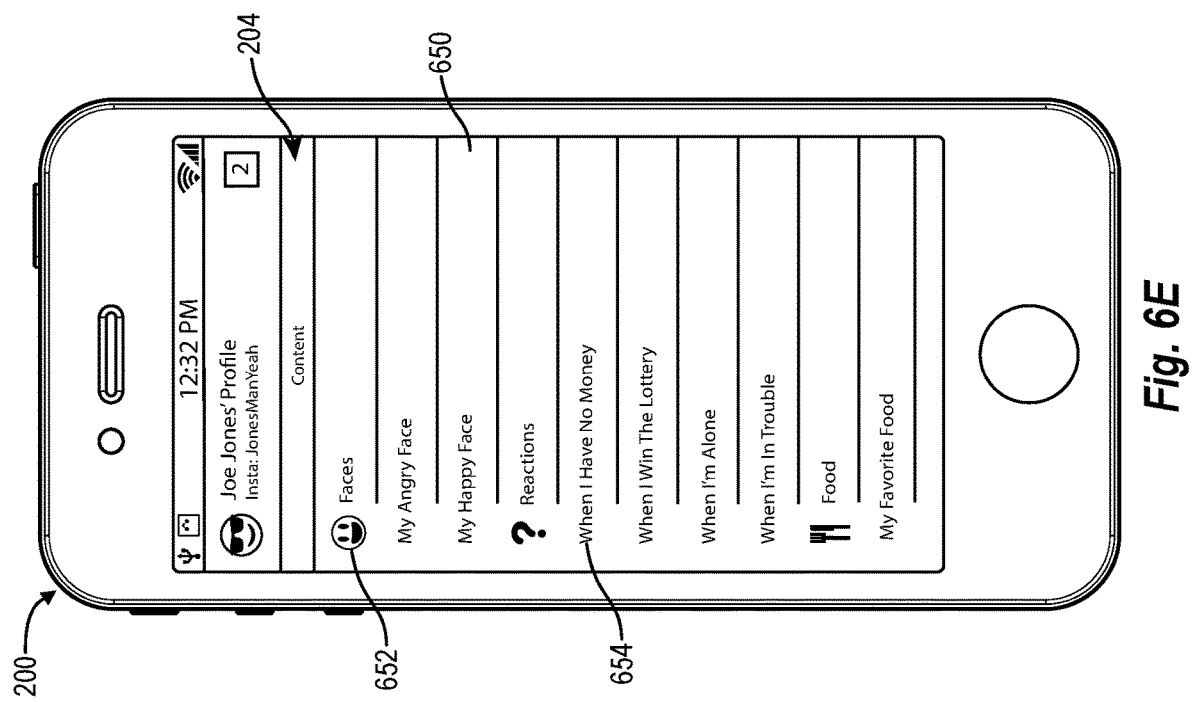

Although FIGS. 6A-6C illustrate navigating a video profile by displaying individual digital videos of other users, the digital video profile system 100 can also display a video silo structure of another user via a video silo structure display area. For example, FIG. 6E illustrates the computing device and the user interface 204 displaying a video silo structure display area 650 corresponding to the video silo structure of the second user (i.e., the video silo structure for "Joe Jones"). A user can interact with any of the categories and/or video silos within the video silo structure display area 650 and view digital videos corresponding to the categories and/or video silos. For example, based on user interaction with the "Faces" category 652, the digital video profile system 100 can provide a digital video corresponding to the "My Angry Face" video silo from the second user's video profile for display. Similarly, based on user interaction with the "When I Have No Money" video silo 654, the digital video profile system 100 can provide a corresponding digital video for display. In this manner, the digital video profile system 100 can provide specific digital videos and corresponding video silos of interest from video profiles of other users for display.

Figure 7B:
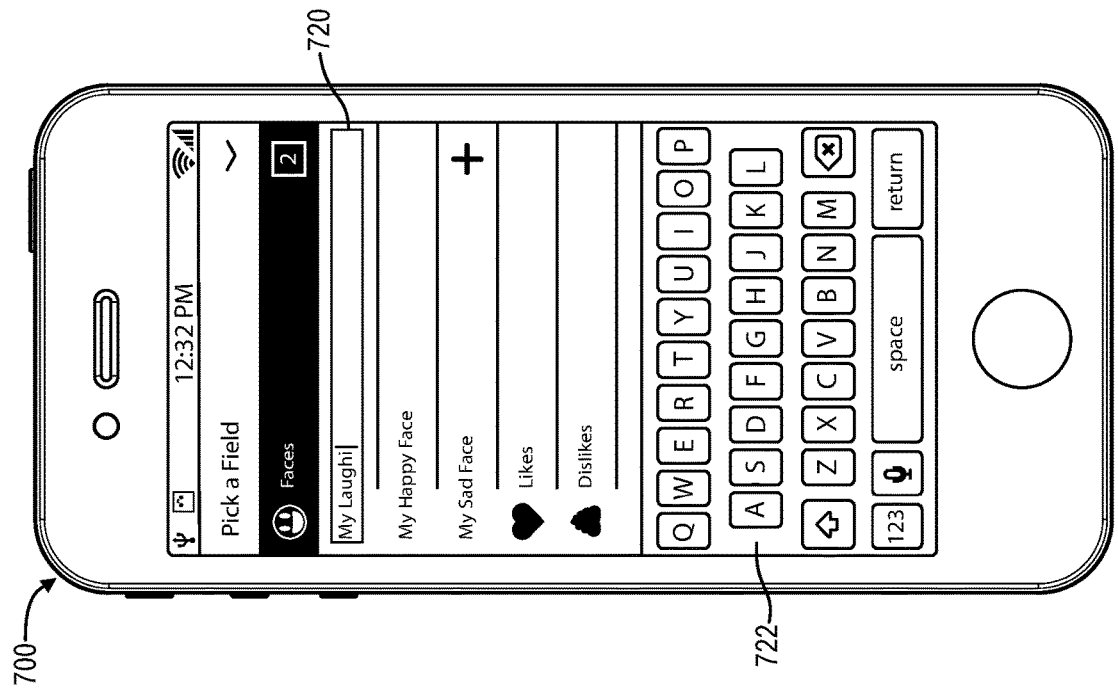
FIGS. 7A-7C illustrate a computing device and user interface for generating and populating custom video silos in accordance with one or more embodiments.
Figure 7A:
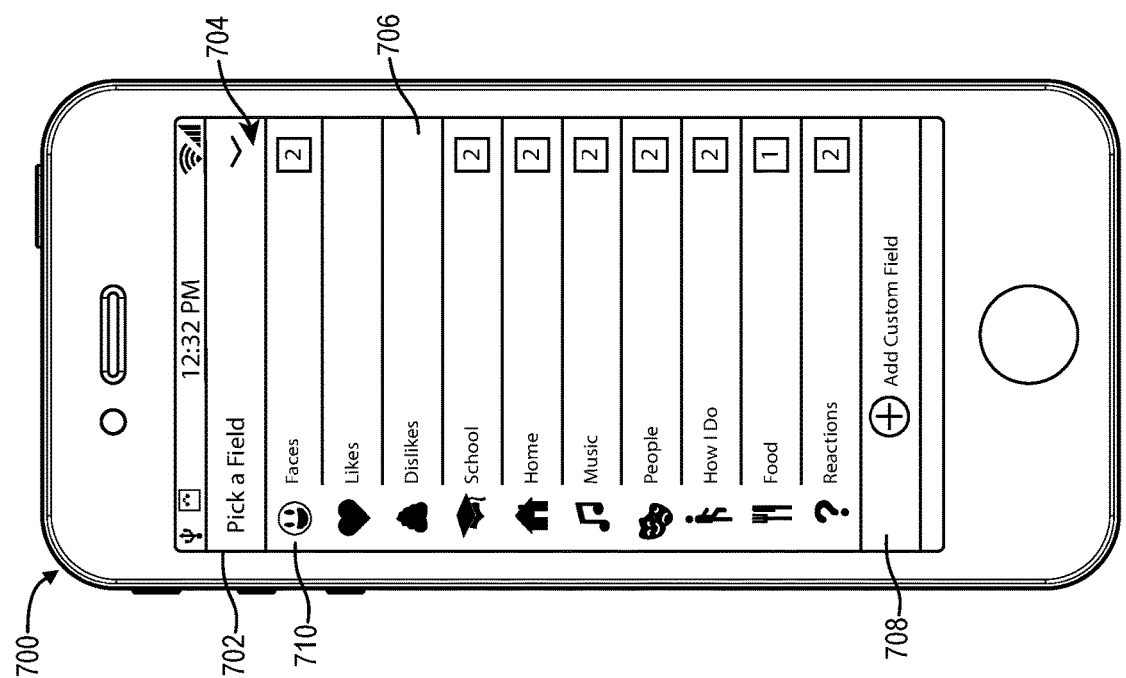
Figure 7C:
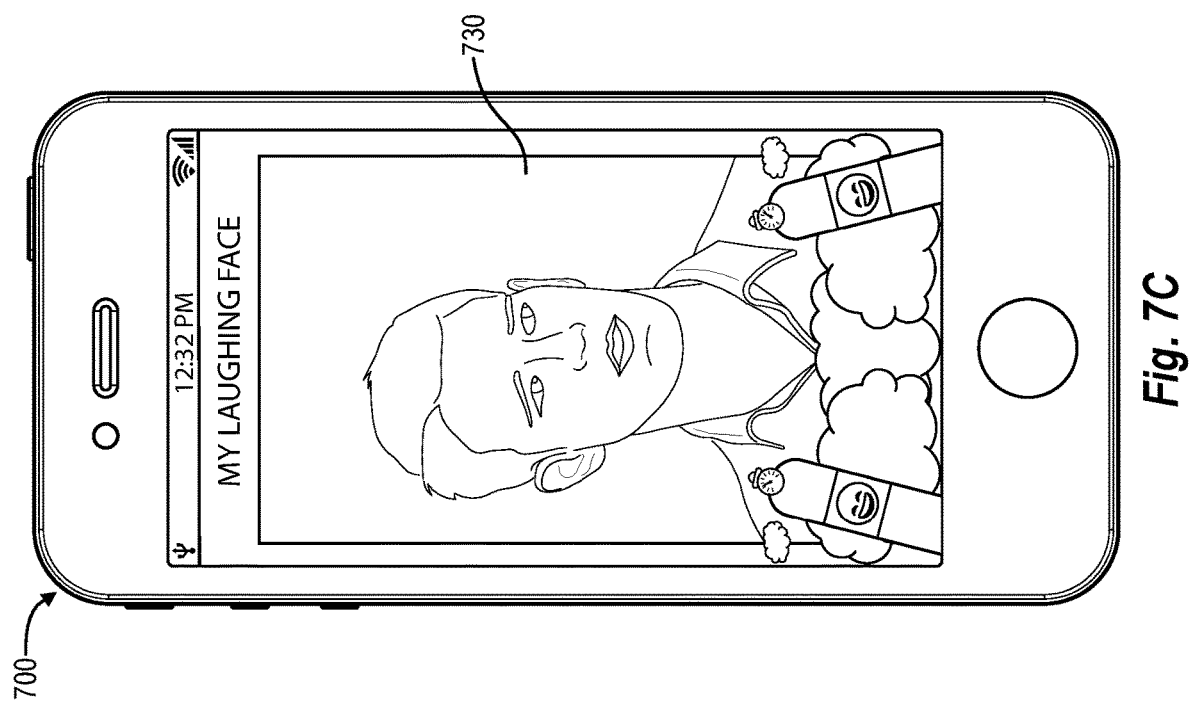

As mentioned above, the digital video profile system 100 can also generate custom video silos. For example, FIGS. 7A-7C illustrate generating and utilizing custom video silos in accordance with one or more embodiments. Specifically, FIG. 7A illustrates a computing device 700 with a touchscreen 702 and a user interface 704 that includes a video silo structure display area 706 and a custom field element 708. Upon user interaction with the custom field element 708, the digital video profile system 100 can add a custom field to the video silo structure displayed in the video silo structure display area 706.

The digital video profile system 100 can generate a custom field based on user input. For example, the digital video profile system 100 can receive user input of a topic corresponding to the custom video silo, one or more categories corresponding to the custom video silo, and/or an overlay corresponding to the custom video silo. For example, FIG. 7B illustrates the computing device 700 and the user interface 704 displaying a topic input element 720.

Upon user interaction with the custom field element 708, the digital video profile system 100 provides options for selecting a category corresponding to a custom video silo. For example, in relation to FIG. 7B, the user selects the "Faces" category 710. In response, the digital video profile system 100 also provides the topic input element 720. Moreover, as shown, the digital video profile system 100 provides a keyboard 722 for user input of a topic via the topic input element 720. Upon user input of a topic, the digital video profile system 100 can also provide a user input for user input of an overlay corresponding to the custom video silo (e.g., a user interface for selecting overlays or a user interface for designing overlays).

Based on user input, the digital video profile system 100 can generate a custom video silo, add the custom video silo to a video silo structure, and populate the custom video silo. For example, the digital video profile system 100 can generate a custom video silo with a topic of "My Laughing Face," add the custom video silo to a video silo structure, and display the added custom video silo via the video silo structure display area 706.

In addition, as shown in FIG. 7C, the digital video profile system 100 can capture a digital video corresponding to the custom video silo. In particular, FIG. 7C illustrates a video capture element 730 corresponding to a custom video silo (e.g., a "My Laughing Face" video silo with corresponding overlay and topic). The digital video profile system 100 can utilize the video capture element 730 to capture a digital video and associate the digital video with the custom video silo.

In one or more embodiments, the digital video profile system 100 can also allow users to share and add custom video silos generated by other users. For example, as illustrated in relation to FIGS. 6C, 6D a user can add a custom video silo to a video silo structure by interacting with a custom video silo in a second user's video profile. In addition, the digital video profile system 100 can allow users to send notifications regarding a custom video silo to other users. In this manner, users can generate and propagate custom video silos to other users in a community.

In one or more embodiments, the digital video profile system 100 can also add custom video silos to a pre-defined set of video silos (e.g., a pre-defined set of video silos utilized to provide video silos to other users). Indeed, in one or more embodiments, the digital video profile system 100 monitors utilization of custom video silos. For example, the digital video profile system 100 can track and determine the number of users that add a custom video silo to video silo structures. Based on the number of users that add a custom video silo structure to video silo structures, the digital video profile system 100 can add custom video silos to a pre-defined set of video silos.

For example, the digital video profile system 100 can track the number of users within a particular school that utilize a custom video silo in their video profile (e.g., that add the custom video silo to their video silo structure). By tracking the number of users that utilize the custom video silo, the digital video profile system 100 can determine that a custom video silo satisfies a particular threshold (e.g., that a particular number of users utilize the custom video silo within a particular amount of time). In response, the digital video profile system 100 can add the custom video silo to a pre-defined set of video silos, such that the digital video profile system 100 automatically provides the custom video silo to other users (e.g., automatically includes the custom video silo in video silos provided by the digital video profile system 100).

In this manner, the digital video profile system 100 not only allows users to build and share custom video silos, but the video silos recommended by the digital video profile system 100 can dynamically evolve over time to include additional video silos.

As mentioned previously, in one or more embodiments, the digital video profile system 100 can limit access to video profiles. For example, the digital video profile system 100 can limit user access to video profiles to only a particular community, based on permissions of users (i.e., privacy settings), and/or based on location. In one or more embodiments, the digital video profile system 100 can limit access to video profiles based on a number of users within a community utilizing a video profile application. Specifically, in one or more embodiments, the digital video profile system 100 limits access to video profiles based on a number of users in a school downloading and/or utilizing a video profile application corresponding to the digital video profile system 100.

For example, FIG. 8A illustrates a computing device 800 with a touchscreen 802 and a user interface 804 including a school search element 806. Upon user interaction with the school search element 806, the digital video profile system 100 modifies the user interface 804 to include a list of schools. Specifically, as shown in FIG. 8B, the digital video profile system 100 modifies the user interface 804 to include a school list 810. The school list 810 includes individual school selectable elements 812a-812n corresponding to schools in the vicinity of the user (e.g., closest to the user in location).

Upon selection of one of the school selectable elements 812a-812n, the digital video profile system 100 can determine a school corresponding to the user. Moreover, the digital video profile system 100 can determine a number of users utilizing a video profile application at the school. If the number of users utilizing the video profile application at the school satisfies a minimum threshold (e.g., 20 users) the digital video profile system 100 can allow the user to view the video profile of other users. If the number of users utilizing the video profile application at the school falls below a minimum threshold (e.g., 20 users), the digital video profile system 100 can restrict the user's ability to view video profiles of other users.

In this manner, the digital video profile system 100 can encourage users to invite others to utilize the video profile application. For example, the digital video profile system 100 can include prompts for sending invitations to other users to utilize the video profile application. Indeed, as illustrated in FIG. 8C, the digital video profile system 100 can include selectable elements 820a-820c operable to contact other users via a social networking application and/or a messaging application.

Figure 9B:
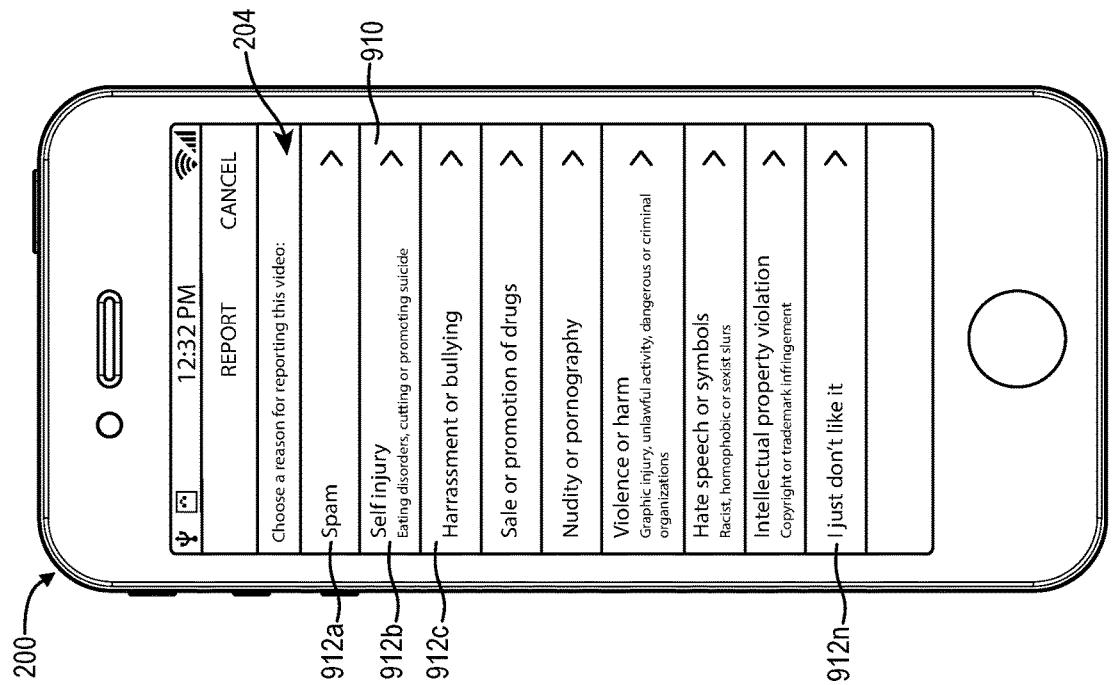
FIGS. 9A-9B illustrate a computing device and user interface for reporting or blocking video profiles and/or users in accordance with one or more embodiments.
Figure 9A:
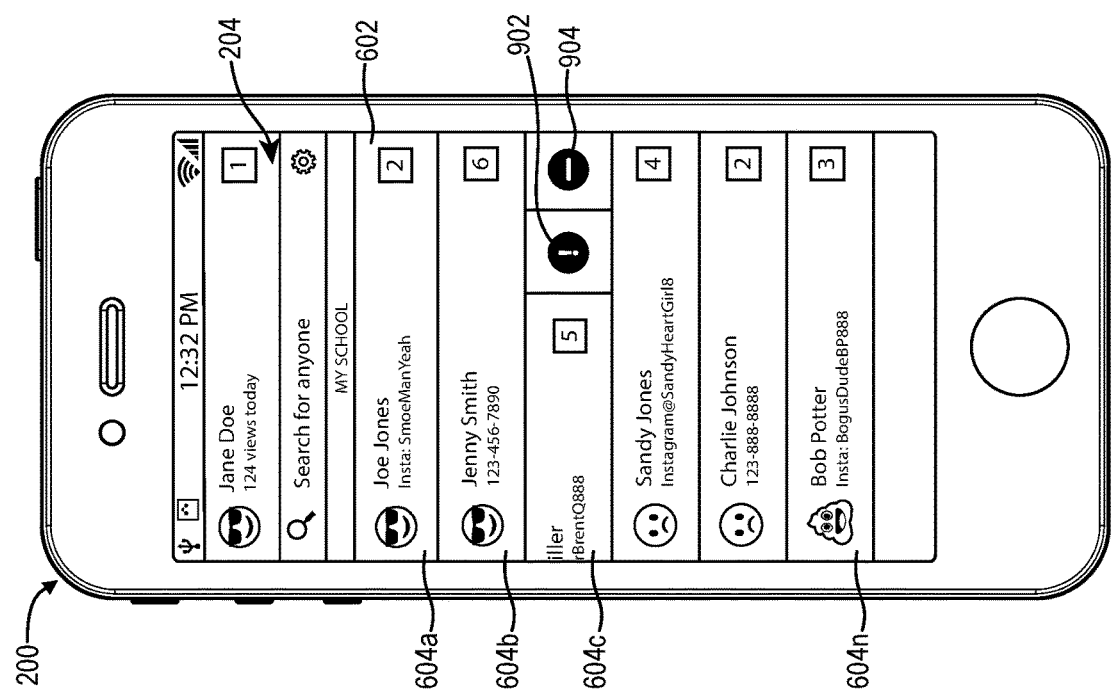

Furthermore, as mentioned above, the digital video profile system 100 can also include elements for reporting improper user conduct or digital content. For example, FIG. 9A illustrates the computing device 200 and the user interface 204 that includes the video profile list area 602. Upon user interaction (e.g., a swipe gesture) with one of the video profile indicators 604a-604n, the digital video profile system 100 can provide options for blocking or reporting a video profile and/or user. Specifically, FIG. 9A illustrates that upon a swipe gesture to the left with the video profile indicator 604c, the digital video profile system 100 provides a report element 902 and a block element 904.

Upon user interaction with the block element 904, the digital video profile system 100 can remove a video profile and/or blocked user (e.g., "Brent Miller") from the video profile list area 602. Moreover, the digital video profile system 100 can remove the video profile and/or blocked user (e.g., "Brent Miller") from appearing in any future video profile lists of the user (i.e., such that "Brent Miller" no longer appears in the video profile list of "Jane Doe").

Furthermore, in one or more embodiments, upon user interaction with the block element 904, the digital video profile system 100 also removes the user (e.g., "Jane Doe") from appearing on any video profile list of the blocked user (e.g., such that "Jane Doe" no longer appears on the video profile list of "Brent Miller").

As mentioned, the digital video profile system 100 can also report a user. For example, upon user interaction with the report element 902, the digital video profile system 100 can provide a user interface for reporting inappropriate conduct and/or content. In particular, as shown in FIG. 9B, upon user interaction with the report element 902, the digital video profile system 100 modifies the user interface 204 to include a reporting area 910 and a plurality of selectable reporting elements 912*a*-912*n*. Upon user interaction with the reporting elements 912*a*-912*n*, the digital video profile system 100 can generate reports corresponding to a variety of issues, including spam, self-injury, harassment or bullying, sale or promotion of drugs, nudity or pornography, violence or harm, hat speech, intellectual property violations, or other issues.

In response to a report, the digital video profile system 100 can also take a variety of actions. For example, the digital video profile system 100 can remove a digital video, remove a video silo, remove a video profile, or prohibit a user from utilizing a video profile application (e.g., prohibit a user from utilizing the digital video profile system 100).

Figure 10:
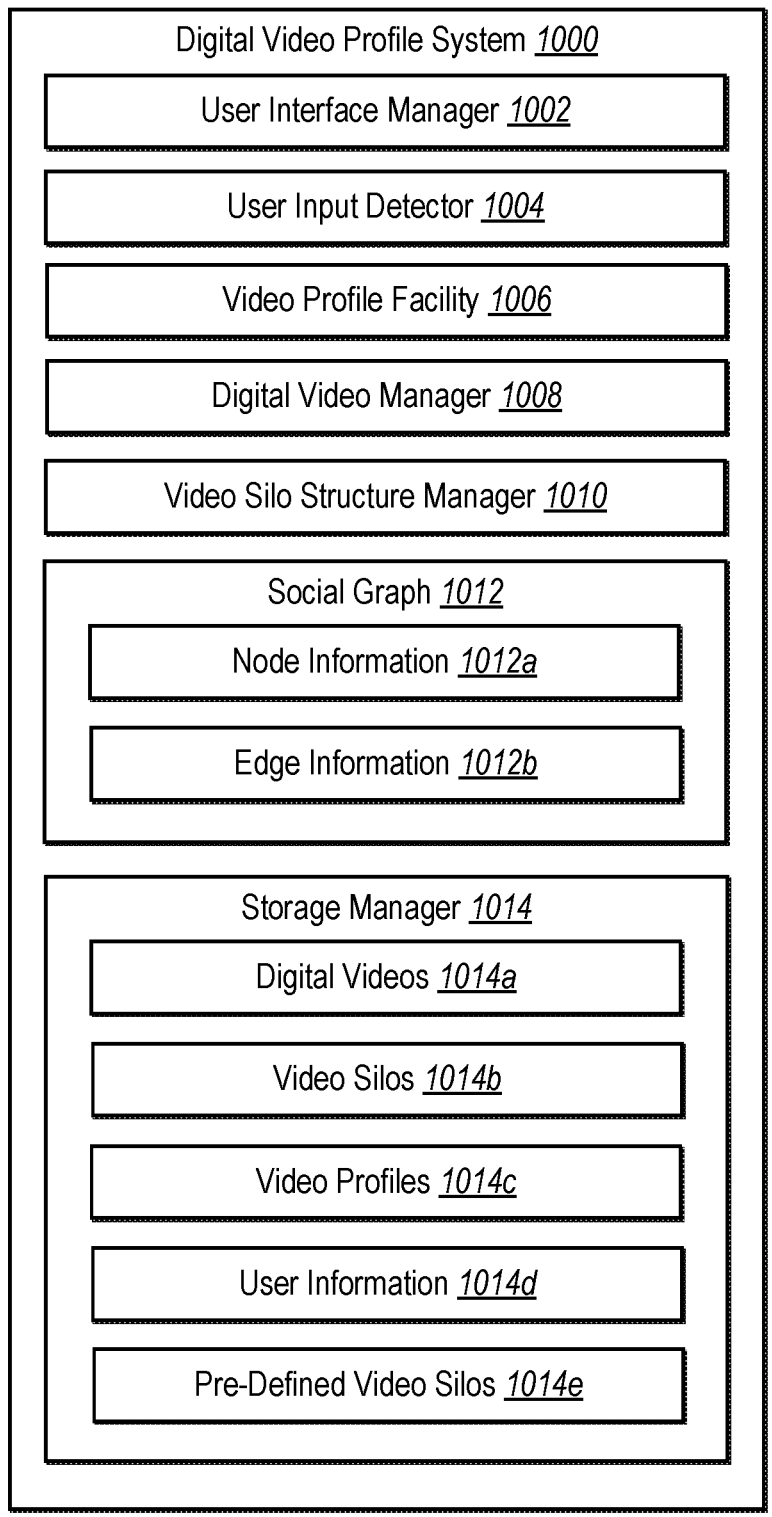
FIG. 10 illustrates a schematic diagram of a digital video profile system in accordance with one or more embodiments.

Turning now to FIG. 10, additional detail will be provided regarding various components and capabilities of the digital video profile system 100. In particular, FIG. 10 illustrates an example embodiment of the digital video profile system 100 in accordance with one or more embodiments. As shown, the digital video profile system 100 may include, but is not limited to a user interface manager 1002; a user input detector 1004; a video profile facility 1006; a digital video manager 1008; a video silo structure manager 1010; a social graph 1012 (including node information 1012*a* and edge information 1012*b*); and a storage manager 1014 (including digital videos 1014*a*, video silos 1014*b*, video profiles 1014*c*, user information 1014*d*, and pre-defined video silos 1014*e*).

As just mentioned, and as illustrated in FIG. 10, the digital video profile system 100 includes the user interface manager 1002. The user interface manager 1002 can provide, manage, and/or control a graphical user interface (or simply "user interface") for use with the digital video profile system 100 (e.g., the user interfaces 204, 704, 804). In particular, the user interface manager 1002 may facilitate presentation of information by way of an external component of a client device. For example, the user interface manager 1002 may display a user interface by way of a display screen associated with the client device. The user interface may be composed of a plurality of graphical components, objects, and/or elements that allow a user to perform a function. The user interface manager 1002 can present, via the client device, a variety of types of information, including text, images, video, audio, characters, or other information. Moreover, the user interface manager 1002 can provide a variety of user interfaces specific to any variety of functions, programs, applications, plug-ins, devices, operating systems, and/or components of the client device (e.g., via a video profile application and/or social networking application). Additional details with respect to various example user interface elements are described throughout with regard to various embodiments containing user interfaces.

In addition to the user interface manager 1002, as shown in FIG. 10, the digital video profile system 100 also includes the user input detector 1004. The user input detector 1004 can detect, identify, monitor, receive, process, capture, and/or record various types of user input. For example, the user input detector 1004 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 1004 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 1004 can detect and identify various types of user interactions with user input devices, such as select events, drag events, scroll events, and so forth. The user input detector 1004 can also detect a user interaction with respect to a variety of user interface elements.

In addition, as illustrated in FIG. 10, the digital video profile system 100 also includes the video profile facility 1006. The video profile facility 1006 can create, generate, establish, share, disperse, navigate, and/or modify video profiles. In particular, the video profile facility 1006 can generate a video profile that associates one or more digital videos with a user. More specifically, the video profile facility 1006 can generate a video profile that associates digital videos and video silos corresponding to a user. Moreover, based on a video file silo structure (received from the video silo structure manager 1010), the video profile facility 1006 can generate a video profile that associated digital videos and video silos corresponding to a user, arranged in accordance with a video silo structure.

In addition, the video profile facility 1006 can also share one or more video profiles. For example, as described above, the video profile facility 1006 can share a video profile corresponding to a first user with a client device corresponding to a second user.

Furthermore, as illustrated in FIG. 10, the digital video profile system 100 also includes the digital video manager 1008. The digital video manager 1008 can capture, create, generate, and/or modify digital videos. For example, the digital video manager 1008 can operate in conjunction with a digital camera to capture a digital video. Moreover, the digital video manager 1008 can send or receive digital videos (e.g., send digital videos from a client device to a remote server or vice versa).

The digital video manager 1008 can also associate a digital video with a video silo (e.g., populate an unpopulated video silo with a digital video). For example, the digital video manager 1008 can receiver user input (e.g., from the user input detector 1004) identifying a video silo corresponding to a digital video. The digital video manager 1008 can associate the digital video with a video silo.

Moreover, as shown in FIG. 10, the digital video profile system 100 also includes the video silo structure manager 1010. The video silo structure manager 1010 can generate, create, define, change, and/or modify a video silo structure. In particular, the video silo structure manager 1010 can select video silos from a pre-defined set of video silos (e.g., the pre-defined video silos 1014*e*) and arranged the selected video silos according to categories.

Moreover, the video silo structure manager 1010 can modify a video silo structure. In particular, the video silo structure manager 1010 can modify a video silo structure in response to a captured digital video (e.g., a digital video captured by the digital video manager 1008). As discussed above, the video silo structure manager 1010 can modify a video silo structure in a number of ways based on a variety of different factors.

As further illustrated in FIG. 10, in the case of the digital video profile system 100 comprising a social networking system, the digital video profile system 100 may include a social graph 1012 for representing and analyzing a plurality of users and concepts. As shown in FIG. 10, the social graph 1012 can include node information 1012a that stores information comprising nodes for users, nodes for concepts, and/or nodes for items. In addition, the social graph 1012 can include edge information 1012b comprising relationships between nodes and/or actions occurring within the social-networking system. Further detail regarding social-networking systems, social graphs, edges, and nodes is presented below.

The digital video profile system 100 can utilize the social graph 1012 in a variety of steps to determine, identify, select, create, or generate a video profile, video silo, or video silo structure. For example, the digital video profile system 100 can utilize the social graph 1012 (e.g., via the video silo structure manager 1010) to select video silos in generating a video silo structure.

As shown in FIG. 10, the digital video profile system 100 may also contain the storage manager 1014. The storage manager 1014 maintains data for the digital video profile system 100. The storage manager 1014 can maintain data of any type, size, or kind, as necessary to perform the functions of the digital video profile system 100. As shown, the storage manager 1014 includes digital videos 1014a (e.g., captured digital videos from one or more users), video silos 1014b (e.g., selected video silos, custom video silos, and corresponding video silo structures), video profiles 1014c (e.g., a database associating users with video silos, digital videos, and video silo structures); user information 1014d (e.g., user history, demographic information, contact information, community information, or location information); and pre-defined video silos 1014e. In one or more embodiments, the video profiles 1014c includes the digital videos 1014a, the video silos 1014b, and/or one or more other elements of the storage manager 1014.

Each of the components 1002-1014 of the digital video profile system 100 and their corresponding elements may be in communication with one another using any suitable communication technologies. It will be recognized that although components 1002-1014 and their corresponding elements are shown to be separate in FIG. 10, any of components 1002-1014 and their corresponding elements may be combined into fewer components, such as into a single facility or module, divided into more components, or configured into different components as may serve a particular embodiment.

The components 1002-1014 and their corresponding elements can comprise software, hardware, or both. For example, the components 1002-1014 and their corresponding elements can comprise one or more instructions stored on a computer-readable storage medium and executable by processors of one or more computing devices. The components 1002-1014 and their corresponding elements can comprise hardware, such as a special purpose processing device to perform a certain function or group of functions. Additionally, or alternatively, the components 1002-1014 and their corresponding elements can comprise a combination of computer-executable instructions and hardware.

Furthermore, the components 1002-1014 of the digital video profile system 100 may, for example, be implemented as one or more stand-alone applications, as one or more modules of an application, as one or more plug-ins, as one or more library functions or functions that may be called by other applications, and/or as a cloud-computing model. Thus, the components 1002-1014 of the digital video profile system 100 may be implemented as a stand-alone application, such as a desktop or mobile application. Furthermore, the components 1002-1014 of the digital video profile system 100 may be implemented as one or more web-based applications hosted on a remote server. Alternatively, or additionally, the components of the digital video profile system 100 may be implemented in a suit of mobile device applications or "apps."

Figure 11:
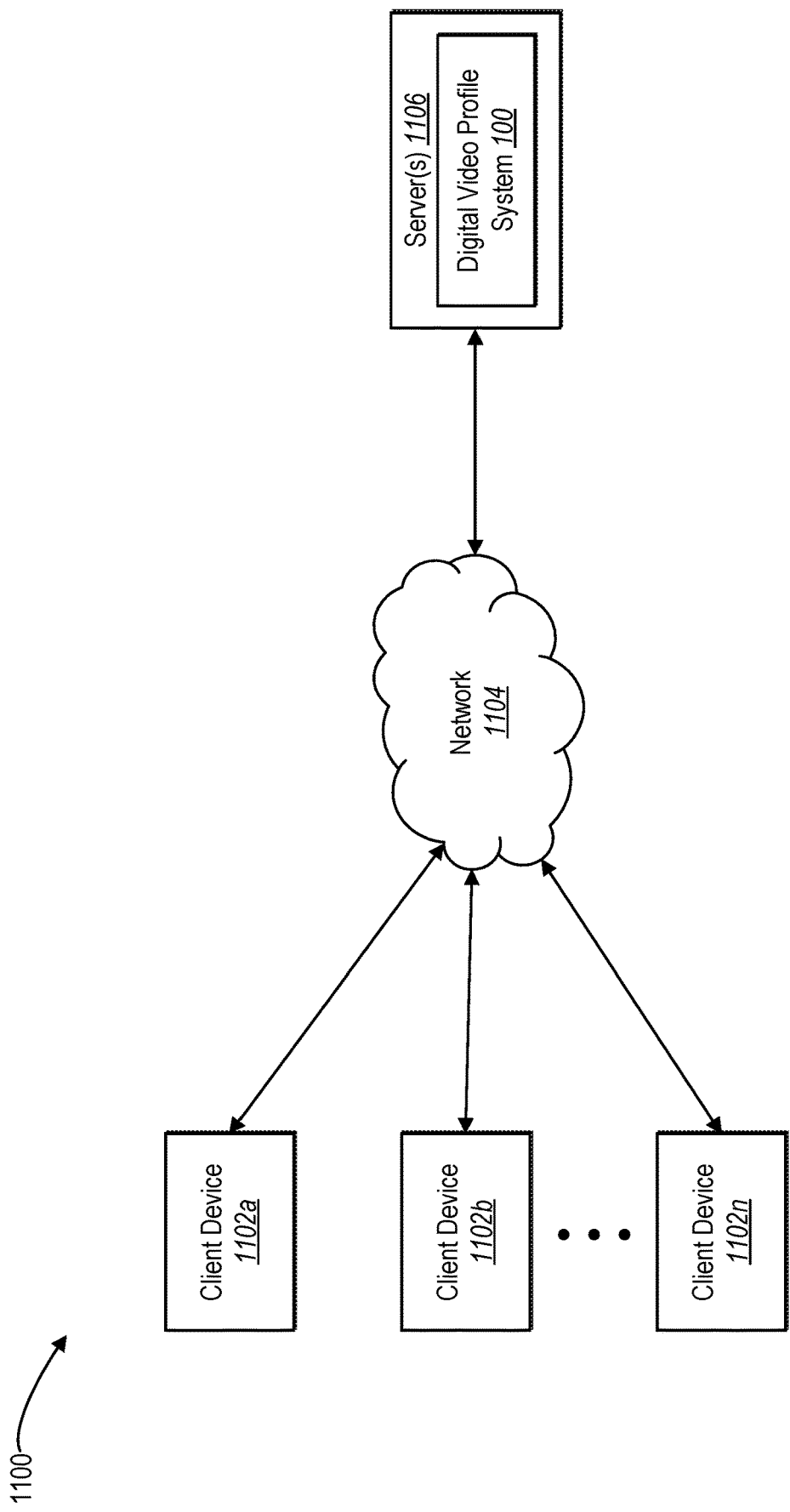
FIG. 11 illustrates a schematic diagram of a network environment in which the methods and systems disclosed herein may be implemented in accordance with one or more embodiments.

Turning now to FIG. 11, further information will be provided regarding implementation of the digital video profile system 100. Specifically, FIG. 11 illustrates a schematic diagram of one embodiment of an exemplary system environment ("environment") 1100 in which the digital video profile system 100 can operate. As illustrated in FIG. 11, the environment 1100 can include client devices 1102a-1102n (e.g., the first client device 102, the second client device 106, the computing device 200, the computing device 700, and/or the computing device 800), a network 1104, and server(s) 1106. The client devices 1102a-1102n, the network 1104, and the server(s) 1106 may be communicatively coupled with each other either directly or indirectly (e.g., through the network 1104). The client devices 1102a-1102n, the network 1104, and the server(s) 1106 may communicate using any communication platforms and technologies suitable for transporting data and/or communication signals, including any known communication technologies, devices, media, and protocols supportive of remote data communications, examples of which will be described in more detail below.

As just mentioned, and as illustrated in FIG. 11, the environment 1100 can include the client devices 1102a-1102n. The client devices 1102a-1102n may comprise any type of computing device. For example, the client devices 1102a-1102n may comprise one or more personal computers, laptop computers, mobile devices, mobile phones, tablets, special purpose computers, TVs, or other computing devices. In one or more embodiments, the client devices 1102a-1102n may comprise computing devices capable of communicating with each other or the server(s) 1106. The client devices 1102a-1102n may comprise one or more computing devices as discussed in greater detail below in relation to FIG. 13.

As illustrated in FIG. 11, the client devices 1102a-1102n and/or the server(s) 1106 may communicate via the network 1104. The network 1104 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 1104 may be any suitable network over which the client devices 1102a-1102n may access the server(s) 1106 or vice versa. The network 1104 will be discussed in more detail below in relation to FIG. 13.

Moreover, as illustrated in FIG. 11, the environment 1100 also includes the server(s) 1106. The server(s) 1106 may generate, store, receive, and/or transmit any type of data, including digital videos 1014a, video silos 1014b, video profiles 1014c, user information 1014d, and/or pre-defined video silos 1014e. For example, the server(s) 1106 may receive data from the client device 1102*a* and send the data to the client device 1102*b*. In one example, server(s) 1106 can host a social networking system. In one or more embodiments, the server(s) 1106 may comprise a data server. The server(s) 1106 can also comprise a communication server or a web-hosting server. Regardless, the server(s) 1106 can be configured to receive a wide range of electronic documents or communications. Additional details regarding the server(s) 1106 will be discussed below in relation to FIG. 13.

Although FIG. 11 illustrates three client devices 1102*a*-1102*n*, it will be appreciated that the client devices 1102*a*-1102*n* can represent any number of computing devices (fewer or greater than shown). Similarly, although FIG. 11 illustrates a particular arrangement of the client devices 1102*a*-1102*n*, the network 1104, and the server(s) 1106, various additional arrangements are possible.

By way of example, in one or more embodiments the server(s) 1106 download a video profile application to the client devices 1102*a*-1102*n*. Moreover, the server(s) 1106 provide (e.g., via the video silo structure manager 1010) a video silo structure to the client devices 1102*a*-1102*n* comprising a plurality of unpopulated video silos. The client devices 1102*a*-1102*n* capture digital videos corresponding to the unpopulated video silos (e.g., via the digital video manager 1008) and send the captured digital videos to the server(s) 1106. The server(s) 1106 generate video profiles (e.g., via the video profile facility 1006) for each user of the client devices 1102*a*-1102*n* and associate the captured digital videos with corresponding video silos in each user's video profile. Moreover, the server(s) 1106 also modify the video silo structure corresponding to each user of each client device 1102*a*-1102*n* (e.g., via the video silo structure manager 1010). Further, the server(s) 1106 can provide the modified video silo structures to the corresponding client devices 1102*a*-1102*n*.

Furthermore, the server(s) 1106 can share the video profiles (and video silo structures) across the client devices 1102*a*-1102*n*. For example, the client device 1102*b* can request a video profile corresponding to the user of the client device 1102*a*. In response, the server(s) 1106 can provide the video profile of the user of the client device 1102*a* to the client device 1102*b* (e.g., via the video profile facility 1006). Moreover, as discussed above, the client device 1102*b* can interact with the video profile of the user of the client device 1102*a* (e.g., via the user interface manager 1002 and the user input detector 1004). Moreover, in response to the user interaction with the video profile of the user of the client device 1102*a*, the server(s) 1106 can modify the video silo structure of the user of the client device 1102*b* (e.g., via the video silo structure manager 1010).

As illustrated by the previous example embodiments, the digital video profile system 100 may be implemented in whole, or in part, by the individual elements 1102*a*-1106 of the environment 1100. Although FIG. 11 illustrates the digital video profile system 100 implemented with regard to the server(s) 1106, it will be appreciated that components of the digital video profile system 100 can be implemented in any of the components of the environment 1100. For example, in one or more embodiments, the user interface manager 1002, the user input detector 1004, the video profile facility 1006, the digital video manager 1008, and the video silo structure manager 1010 are implemented on the client device 1102*a*.

Figure 12:
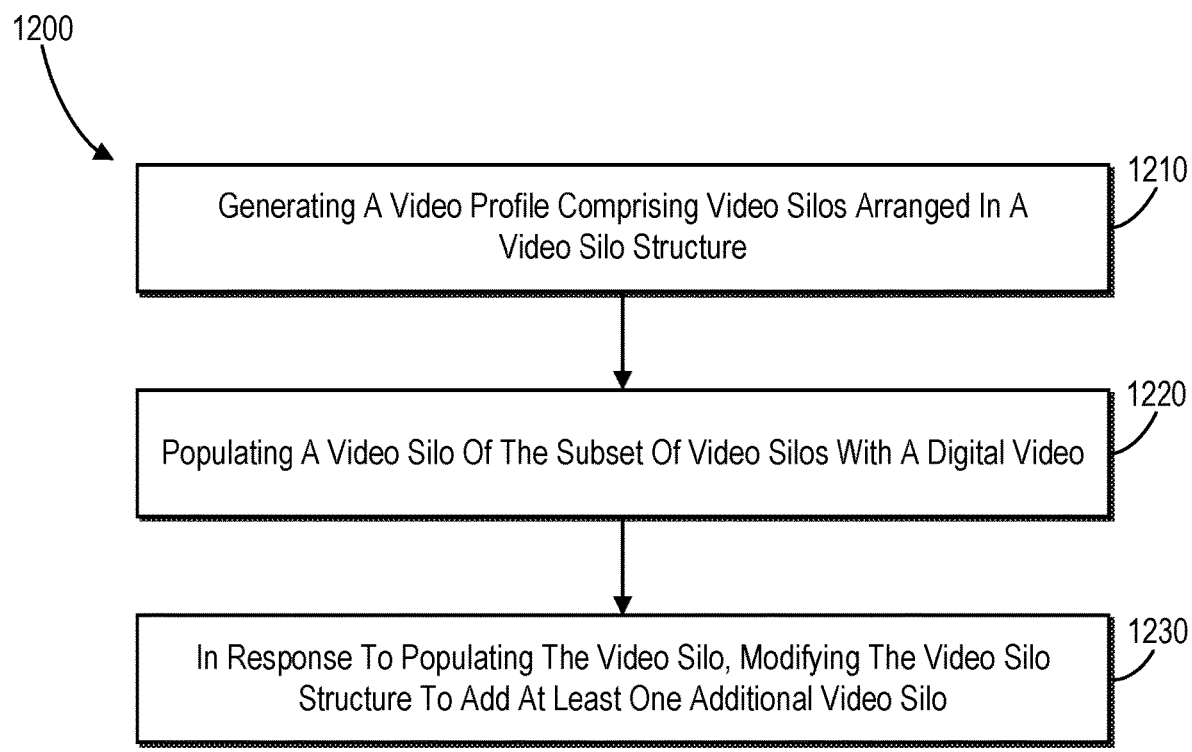
FIG. 12 illustrates a flow chart of a method of generating a video profile utilizing unpopulated video silos arranged in a video silo structure in accordance with one or more embodiments.

FIGS. 1-11, the corresponding text, and the examples, provide a number of different systems and devices that generate a video profile utilizing a video silo structure. In addition to the foregoing, embodiments can also be described in terms of flowcharts comprising acts and steps in a method for accomplishing a particular result. For example, FIG. 12 illustrates a flowchart of exemplary methods in accordance with one or more embodiments of the present invention. The methods described in relation to FIG. 12 may be performed with less or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart of a series of acts in a method 1200 of generating a video profile utilizing a video silo structure in accordance with one or more embodiments. In one or more embodiments, the method 1200 is performed in a digital medium environment that includes the digital video profile system 100. The method 1200 is intended to be illustrative of one or more methods in accordance with the present disclosure, and is not intended to limit potential embodiments. Alternative embodiments can include additional, fewer, or different steps than those articulated in FIG. 12.

As illustrated in FIG. 12, the method 1200 includes an act 1210 of generating a video profile comprising video silos arranged in a video silo structure. In particular, the act 1210 can include generating, by at least one processor, a video profile corresponding to a first user, wherein the video profile comprises a subset of unpopulated video silos arranged in a video silo structure, the subset of unpopulated video silos selected from a plurality of pre-defined video silos. For example, in one or more embodiments, the video silo structure comprises video silos organized into a plurality of categories.

In addition, as shown in FIG. 12, the method 1200 also includes an act 1220 of populating a video silo of the subset of video silos with a digital video. In particular, the act 1220 can include populating a video silo of the subset of unpopulated video silos with a video received from a first client device of the first user.

Furthermore, as illustrated in FIG. 12, the method 1200 also includes an act 1230 of, in response to populating the video silo, modifying the video silo structure to add at least one additional video silo. In particular, the act 1230 can include, in response to populating the video silo, modifying the video silo structure, by the at least one processor, to add at least one additional unpopulated video silo from the plurality of pre-defined video silos to the video profile of the first user. For example, in one or more embodiments, the act 1230 includes adding a new category to the plurality of categories that includes the at least one additional unpopulated video silo to the video silo structure. In addition, the act 1230 can also include detecting a category corresponding to the populated video silo; and selecting the at least one additional unpopulated video silo based on the category of the populated video silo.

Moreover, in one or more embodiments, the method 1200 also includes providing for display via the first client device, the video profile and the video silo structure by providing indicators of the populated video silo, the unpopulated video silos, and the plurality of categories. In addition, the method 1200 can include providing the video received from the first client device corresponding to the populated video silo for display via a user interface; based on a first user interaction type with the user interface, providing a second video corresponding to the populated video silo for display via the user interface; and based on a second user interaction type with the user interface, providing a third video corresponding to a second populated video silo for display via the user interface.

Further, the method 1200 can also include providing for display to a second client device of a second user, a user interface comprising a list of indicators of video profiles of a plurality of users, the list comprising a visual indicator of the video profile of the first user; and based on an indication of user interaction, via the second client device of the second user, with the visual indicator of the video profile of the first user, providing the video profile for display to the second client device such that the second user can view the video. The method 1200 can also include receiving, via the second client device of the second user, an indication of user interaction with the populated video silo from the video profile of the first user; and based on the indication of user interaction with the populated video silo from the video profile of the first user, modifying a video silo structure corresponding to the second user to include an unpopulated video silo corresponding to the populated video silo from the video profile of the first user. In addition, in one or more embodiments, the method 1200 also includes modifying the visual indicator of the video profile of the first user based on at least one of: the number of populated video silos in the video profile of the first user or the amount of time since a digital video was added to the video profile of the first user.

Figure 13:
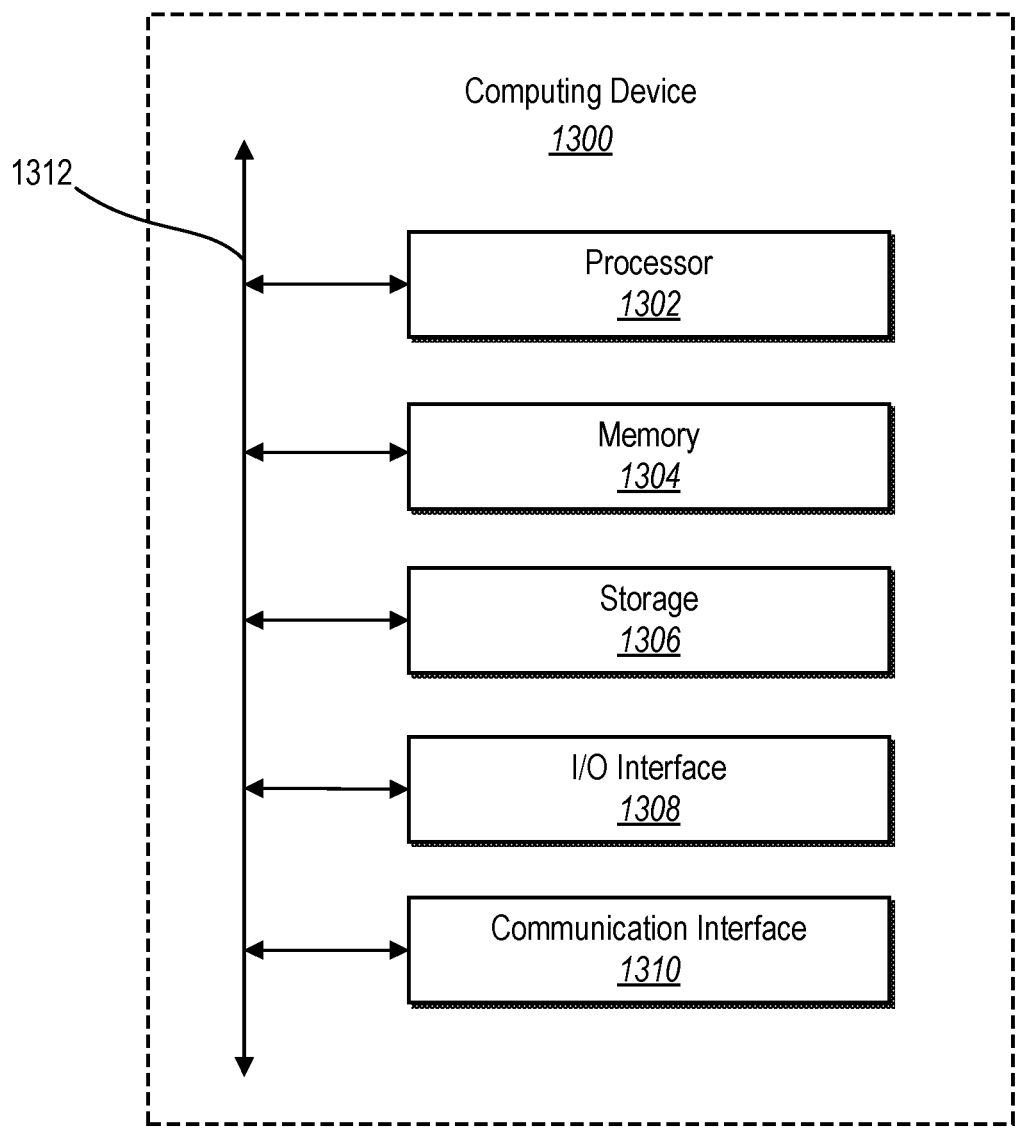
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that the first client device 102, the second client device 106, the computing device 200, the computing device 700, the computing device 800, the client devices 1102a-1102n, and the server(s) 1106, comprise one or more computing devices in accordance with implementations of computing device 1300. As shown by FIG. 13, the computing device can comprise a processor 1302, a memory 1304, a storage device 1306, an I/O interface 1308, and a communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other embodiments. Furthermore, in certain embodiments, a computing device 1300 can include fewer components than those shown in FIG. 13. Components of computing device 1300 shown in FIG. 13 will now be described in additional detail.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage device 1306 and decode and execute them. In particular embodiments, processor 1302 may include one or more internal caches for data, instructions, or addresses. As an example and not by way of limitation, processor 1302 may include one or more instruction caches, one or more data caches, and one or more translation lookaside buffers (TLBs). Instructions in the instruction caches may be copies of instructions in memory 1304 or storage 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to the computing device 1300. In particular embodiments, storage device 1306 is non-volatile, solid-state memory. In other embodiments, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the environment 1100 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similar to events, the calendar entries may include times, dates, locations and identities of other users.

Figure 14:
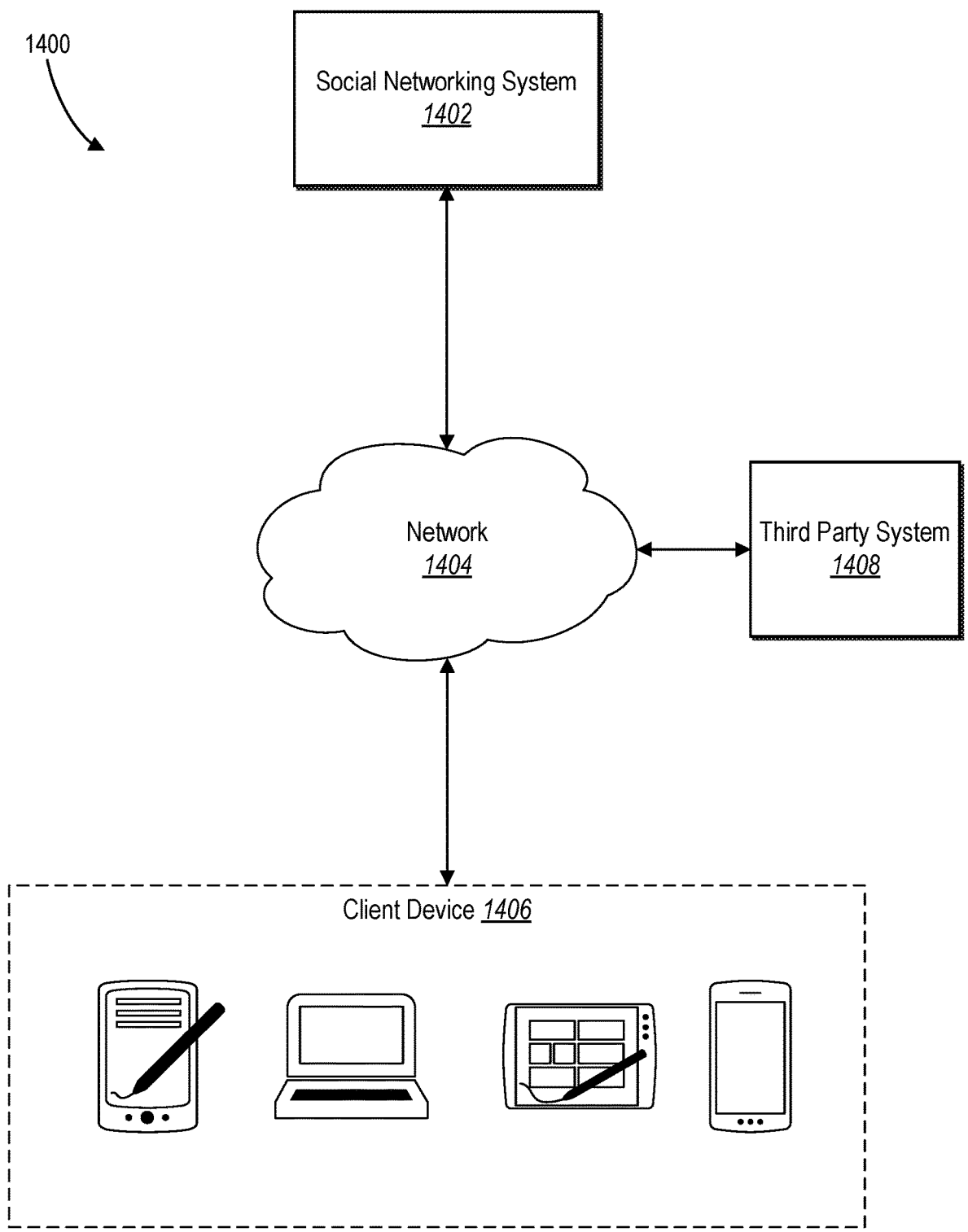
FIG. 14 illustrates a network environment of a social-networking system according one or more embodiments.

FIG. 14 illustrates an example network environment of a social-networking system. In particular embodiments, a social-networking system 1402 may comprise one or more data stores. In particular embodiments, the social-networking system 1402 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1402 may comprise one or more computing devices (e.g., servers) hosting functionality directed to operation of the social-networking system 1402. A user of the social-networking system 1402 may access the social-networking system 1402 using a client device such as client device 1406. In particular embodiments, the client device 1406 can interact with the social-networking system 1402 through a network 1404.

The client device 1406 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1404.

Network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1406 may access the social-networking system 1402.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 15:
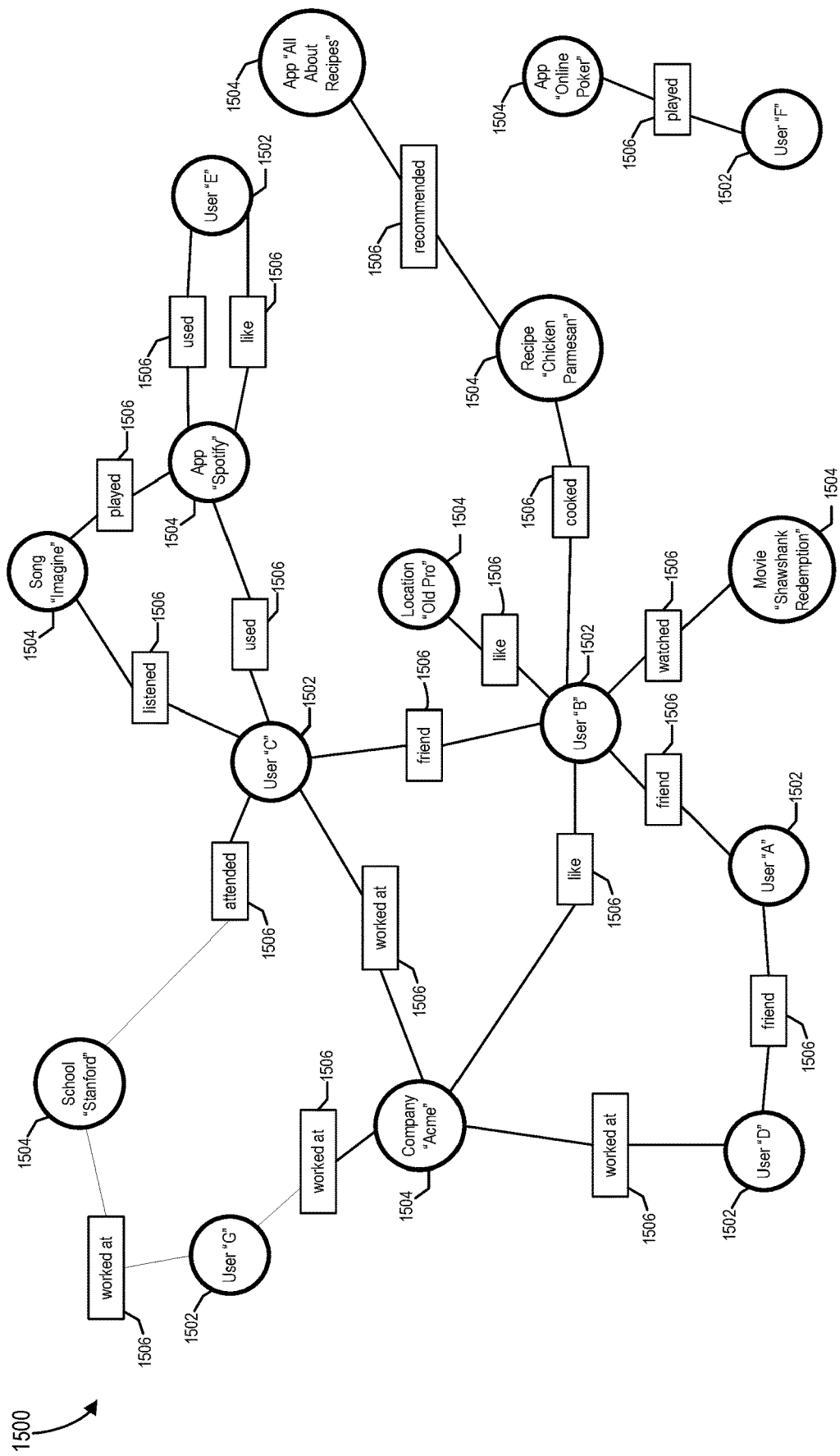
FIG. 15 illustrates an example social graph of a social networking system in accordance with one or more embodiments.

FIG. 15 illustrates example social graph 1500. In particular embodiments, social networking system 1402 may store one or more social graphs 1500 in one or more data stores. In particular embodiments, social graph 1500 may include multiple nodes—which may include multiple user nodes 1502 or multiple concept nodes 1504—and multiple edges 1506 connecting the nodes. Example social graph 1500 illustrated in FIG. 15 is shown, for didactic purposes, in a two-dimensional visual map representation. In particular embodiments, a social networking system 1402, client device 1406, or third-party system 1408 may access social graph 1500 and related social-graph information for suitable applications. The nodes and edges of social graph 1500 may be stored as data objects, for example, in a data store (such as a social-graph database). Such a data store may include one or more searchable or query able indexes of nodes or edges of social graph 1500.

In particular embodiments, a user node 1502 may correspond to a user of social networking system 1402. As an example and not by way of limitation, a user may be an individual (human user), an entity (e.g., an enterprise, business, or third-party application), or a group (e.g., of individuals or entities) that interacts or communicates with or over social networking system 1402. In particular embodiments, when a user registers for an account with social networking system 1402, social networking system 1402 may create a user node 1502 corresponding to the user, and store the user node 1502 in one or more data stores. Users and user nodes 1502 described herein may, where appropriate, refer to registered users and user nodes 1502 associated with registered users. In addition or as an alternative, users and user nodes 1502 described herein may, where appropriate, refer to users that have not registered with social networking system 1402. In particular embodiments, a user node 1502 may be associated with information provided by a user or information gathered by various systems, including social networking system 1402. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1504 may correspond to a concept. As an example and not by way of limitation, a concept may correspond to a place (such as, for example, a movie theater, restaurant, landmark, or city); a website (such as, for example, a website associated with social-network system 1402 or a third-party website associated with a web-application server); an entity (such as, for example, a person, business, group, sports team, or celebrity); a resource (such as, for example, an audio file, video file, digital photo, text file, structured document, or application) which may be located within social networking system 1402 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1504 may be associated with information of a concept provided by a user or information gathered by various systems, including social networking system 1402. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1504 may be associated with one or more data objects corresponding to information associated with concept node 1504. In particular embodiments, a concept node 1504 may correspond to one or more webpages.

In particular embodiments, a node in social graph 1500 may represent or be represented by a webpage (which may be referred to as a "profile page"). Profile pages may be hosted by or accessible to social networking system 1402. Profile pages may also be hosted on third-party websites associated with a third-party server 1408. As an example and not by way of limitation, a profile page corresponding to a particular external webpage may be the particular external webpage and the profile page may correspond to a particular concept node 1504. Profile pages may be viewable by all or a selected subset of other users. As an example and not by way of limitation, a user node 1502 may have a corresponding user-profile page in which the corresponding user may add content, make declarations, or otherwise express himself or herself. As another example and not by way of limitation, a concept node 1504 may have a corresponding concept-profile page in which one or more users may add content, make declarations, or express themselves, particularly in relation to the concept corresponding to concept node 1504.

In particular embodiments, a concept node 1504 may represent a third-party webpage or resource hosted by a third-party system 1408. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1406 to send to social networking system 1402 a message indicating the user's action. In response to the message, social networking system 1402 may create an edge (e.g., an "eat" edge) between a user node 1502 corresponding to the user and a concept node 1504 corresponding to the third-party webpage or resource and store edge 1506 in one or more data stores.

In particular embodiments, a pair of nodes in social graph 1500 may be connected to each other by one or more edges 1506. An edge 1506 connecting a pair of nodes may represent a relationship between the pair of nodes. In particular embodiments, an edge 1506 may include or represent one or more data objects or attributes corresponding to the relationship between a pair of nodes. As an example and not by way of limitation, a first user may indicate that a second user is a "friend" of the first user. In response to this indication, social networking system 1402 may send a "friend request" to the second user. If the second user confirms the "friend request," social networking system 1402 may create an edge 1506 connecting the first user's user node 1502 to the second user's user node 1502 in social graph 1500 and store edge 1506 as social-graph information in one or more of data stores. In the example of FIG. 15, social graph 1500 includes an edge 1506 indicating a friend relation between user nodes 1502 of user "A" and user "B" and an edge indicating a friend relation between user nodes 1502 of user "C" and user "B." Although this disclosure describes or illustrates particular edges 1506 with particular attributes connecting particular user nodes 1502, this disclosure contemplates any suitable edges 1506 with any suitable attributes connecting user nodes 1502. As an example and not by way of limitation, an edge 1506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1500 by one or more edges 1506.

In particular embodiments, an edge 1506 between a user node 1502 and a concept node 1504 may represent a particular action or activity performed by a user associated with user node 1502 toward a concept associated with a concept node 1504. As an example and not by way of limitation, as illustrated in FIG. 15, a user may "like," "attended," "played," "listened," "cooked," "worked at," or "watched" a concept, each of which may correspond to an edge type or subtype. A concept-profile page corresponding to a concept node 1504 may include, for example, a selectable "check in" icon (such as, for example, a clickable "check in" icon) or a selectable "add to favorites" icon. Similarly, after a user clicks these icons, social networking system 1402 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1402 may create a "listened" edge 1506 and a "used" edge (as illustrated in FIG. 15) between user nodes 1502 corresponding to the user and concept nodes 1504 corresponding to the song and application to indicate that the user listened to the song and used the application. Moreover, social networking system 1402 may create a "played" edge 1506 (as illustrated in FIG. 15) between concept nodes 1504 corresponding to the song and the application to indicate that the particular song was played by the particular application. In this case, "played" edge 1506 corresponds to an action performed by an external application (SPOTIFY) on an external audio file (the song "Imagine"). Although this disclosure describes particular edges 1506 with particular attributes connecting user nodes 1502 and concept nodes 1504, this disclosure contemplates any suitable edges 1506 with any suitable attributes connecting user nodes 1502 and concept nodes 1504. Moreover, although this disclosure describes edges between a user node 1502 and a concept node 1504 representing a single relationship, this disclosure contemplates edges between a user node 1502 and a concept node 1504 representing one or more relationships. As an example and not by way of limitation, an edge 1506 may represent both that a user likes and has used at a particular concept. Alternatively, another edge 1506 may represent each type of relationship (or multiples of a single relationship) between a user node 1502 and a concept node 1504 (as illustrated in FIG. 15 between user node 1502 for user "E" and concept node 1504 for "SPOTIFY").

In particular embodiments, social networking system 1402 may create an edge 1506 between a user node 1502 and a concept node 1504 in social graph 1500. As an example and not by way of limitation, a user viewing a concept-profile page (such as, for example, by using a web browser or a special-purpose application hosted by the user's client device 1406) may indicate that he or she likes the concept represented by the concept node 1504 by clicking or selecting a "Like" icon, which may cause the user's client device 1406 to send to social networking system 1402 a message indicating the user's liking of the concept associated with the concept-profile page. In response to the message, social networking system 1402 may create an edge 1506 between user node 1502 associated with the user and concept node 1504, as illustrated by "like" edge 1506 between the user and concept node 1504. In particular embodiments, social networking system 1402 may store an edge 1506 in one or more data stores. In particular embodiments, an edge 1506 may be automatically formed by social networking system 1402 in response to a particular user action. As an example and not by way of limitation, if a first user uploads a picture, watches a movie, or listens to a song, an edge 1506 may be formed between user node 1502 corresponding to the first user and concept nodes 1504 corresponding to those concepts. Although this disclosure describes forming particular edges 1506 in particular manners, this disclosure contemplates forming any suitable edges 1506 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1402). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1402 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1402) or RSVP (e.g., through social networking system 1402) to an event associated with the advertisement. In addition or as an alternative, an advertisement may include social-networking-system context directed to the user. As an example and not by way of limitation, an advertisement may display information about a friend of the user within social networking system 1402 who has taken an action associated with the subject matter of the advertisement.

In particular embodiments, social networking system 1402 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1408 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1402 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1402 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1402 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1402 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1402 may calculate a coefficient based on a user's actions. Social networking system 1402 may monitor such actions on the online social network, on a third-party system 1408, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1402 may calculate a coefficient based on the user's actions with particular types of content. The content may be associated with the online social network, a third-party system 1408, or another suitable system. The content may include users, profile pages, posts, news stories, headlines, instant messages, chat room conversations, emails, advertisements, pictures, video, music, other suitable objects, or any combination thereof. Social networking system 1402 may analyze a user's actions to determine whether one or more of the actions indicate an affinity for subject matter, content, other users, and so forth. As an example and not by way of limitation, if a user may make frequently posts content related to "coffee" or variants thereof, social networking system 1402 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1402 may calculate a coefficient based on the type of relationship between particular objects. Referencing the social graph 1500, social networking system 1402 may analyze the number and/or type of edges 1506 connecting particular user nodes 1502 and concept nodes 1504 when calculating a coefficient. As an example and not by way of limitation, user nodes 1502 that are connected by a spouse-type edge (representing that the two users are married) may be assigned a higher coefficient than user nodes 1502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1402 may determine that the user has a higher coefficient with respect to the first photo than the second photo because having a tagged-in-type relationship with content may be assigned a higher weight and/or rating than having a like-type relationship with content. In particular embodiments, social networking system 1402 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1402 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1500. As an example and not by way of limitation, social-graph entities that are closer in the social graph 1500 (i.e., fewer degrees of separation) may have a higher coefficient than entities that are further apart in the social graph 1500.

In particular embodiments, social networking system 1402 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1406 of the user). A first user may be more interested in other users or concepts that are closer to the first user. As an example and not by way of limitation, if a user is one mile from an airport and two miles from a gas station, social networking system 1402 may determine that the user has a higher coefficient for the airport than the gas station based on the proximity of the airport to the user.

In particular embodiments, social networking system 1402 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1402 may provide information that is relevant to user's interests and current circumstances, increasing the likelihood that they will find such information of interest. In particular embodiments, social networking system 1402 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1402 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1402 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1408 (e.g., via an API or other communication channel), or from another suitable system. In response to the request, social networking system 1402 may calculate the coefficient (or access the coefficient information if it has previously been calculated and stored). In particular embodiments, social networking system 1402 may measure an affinity with respect to a particular process. Different processes (both internal and external to the online social network) may request a coefficient for a particular object or set of objects. Social networking system 1402 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1504 corresponding to a particular photo may have a privacy setting specifying that the photo may only be accessed by users tagged in the photo and their friends. In particular embodiments, privacy settings may allow users to opt in or opt out of having their actions logged by social networking system 1402 or shared with other systems (e.g., third-party system 1408). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1408, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1402 may send a request to the data store for the object. The request may identify the user associated with the request and may only be sent to the user (or a client system 1406 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   generating, by at least one processor, a video profile corresponding to a first user, wherein the video profile comprises a subset of unpopulated video silos arranged in a video silo structure, the subset of unpopulated video silos selected from a plurality of pre-defined video silos, wherein each unpopulated video silo corresponds to a topic, is not populated with a video, but is configured to be populated with at least one video;
   providing, for display via a video silo user interface, the video silo structure including the subset of unpopulated video silos;
   populating a video silo of the subset of unpopulated video silos with a selected video received from a first client device of the first user;
   in response to populating the video silo, modifying the video silo structure, by the at least one processor, to add at least one additional unpopulated video silo from the plurality of pre-defined video silos to the video profile of the first user, wherein the at least one additional unpopulated video silo corresponds to an additional topic, is not populated with a video, but is configured to be populated with one or more videos; and
   providing, for display via the video silo user interface, the modified video silo structure including the at least one additional unpopulated video solo, the populated video silo, and remaining unpopulated video silos from the subset of unpopulated video silos.

2. The method of claim 1, wherein the video silo structure comprises video silos organized into a plurality of categories.

3. The method of claim 2, wherein modifying the video silo structure comprises adding a new category to the plurality of categories that includes the at least one additional unpopulated video silo to the video silo structure.

4. The method of claim 2, further comprising providing for display via the first client device, the video profile and the video silo structure by providing indicators of the at least one additional unpopulated video silo, the populated video silo, the remaining unpopulated video silos from the subset of unpopulated video silos, and the plurality of categories.

5. The method of claim 1, further comprising:
   providing the video received from the first client device corresponding to the populated video silo for display via a user interface;
   based on a first user interaction type with the user interface, providing a second video corresponding to the populated video silo for display via the user interface; and
   based on a second user interaction type with the user interface, providing a third video corresponding to a second populated video silo for display via the user interface.

6. The method of claim 1, further comprising:
   providing for display to a second client device of a second user, a user interface comprising a list of indicators of video profiles of a plurality of users, the list of indicators comprising a visual indicator of the video profile of the first user; and
   based on an indication of user interaction, via the second client device of the second user, with the visual indicator of the video profile of the first user, providing the video profile for display to the second client device such that the second user can view the video.

7. The method of claim 2, wherein modifying the video silo structure comprises:
   detecting a category corresponding to the populated video silo; and
   selecting the at least one additional unpopulated video silo based on the category of the populated video silo.

8. The method of claim 6, further comprising:
   receiving, via the second client device of the second user, an indication of user interaction with the populated video silo from the video profile of the first user; and
   based on the indication of user interaction with the populated video silo from the video profile of the first user, modifying a video silo structure corresponding to the second user to include an unpopulated video silo corresponding to the populated video silo from the video profile of the first user.

9. The method of claim 6, wherein providing for display to the second client device of the second user, the user interface comprising the list of indicators of the video profile of the first user comprises modifying the visual indicator of the video profile of the first user based on at least one of: a number of populated video silos in the video profile of the first user or an amount of time since a digital video was added to the video profile of the first user.

10. A system comprising:
    at least one processor; and
    at least one non-transitory computer readable storage medium storing instructions that, when executed by the at least one processor, cause the system to:
    generate a video profile corresponding to a first user, wherein the video profile comprises a subset of unpopulated video silos arranged in a video silo structure, the subset of unpopulated video silos selected from a plurality of pre-defined video silos, wherein each unpopulated video silo corresponds to a topic, is not populated with a video, but is configured to be populated with at least one video;

provide, for display via a video silo user interface, the video silo structure including the subset of unpopulated video silos;

populate a video silo of the subset of unpopulated video silos with a selected video received from a first client device of the first user;

in response to populating the video silo, modify the video silo structure to add at least one additional unpopulated video silo from the plurality of pre-defined video silos to the video profile of the first user, wherein the at least one additional unpopulated video silo corresponds to an additional topic, is not populated with a video, but is configured to be populated with one or more videos; and provide, for display via the video silo user interface, the modified video silo structure including the at least one additional unpopulated video solo, the populated video silo, and remaining unpopulated video silos from the subset of unpopulated video silos.

11. The system of claim 10, wherein the video silo structure comprises video silos organized into a plurality of categories.

12. The system of claim 10, further comprising instructions that, when executed by the at least one processor, cause the system to:

provide the video received from the first client device corresponding to the populated video silo for display via a user interface;

based on a first user interaction type with the user interface, provide a second video corresponding to the populated video silo for display via the user interface; and based on a second user interaction type with the user interface, provide a third video corresponding to a second populated video silo for display via the user interface.

13. The system of claim 10, further comprising instructions that, when executed by the at least one processor, cause the system to:

provide for display to a second client device of a second user, a user interface comprising a list of indicators of video profiles of a plurality of users, the list of indicators comprising a visual indicator of the video profile of the first user; and based on an indication of user interaction, via the second client device of the second user, with the visual indicator of the video profile of the first user, provide the video profile for display to the second client device such that the second user can view the video.

14. The system of claim 11, further comprising instructions that, when executed by the at least one processor, cause the system to modify the video silo structure by:

detecting a category corresponding to the populated video silo; and selecting the at least one additional unpopulated video silo based on the category of the populated video silo.

15. The system of claim 13, further comprising instructions that, when executed by the at least one processor, cause the system to:

receive, via the second client device of the second user, an indication of user interaction with the populated video silo from the video profile of the first user; and based on the indication of user interaction with the populated video silo from the video profile of the first user, modify a video silo structure corresponding to the second user to include an unpopulated video silo corresponding to the populated video silo from the video profile of the first user.

16. A non-transitory computer readable medium storing instructions thereon that, when executed by at least one processor, cause a computer system to:

generate a video profile corresponding to a first user, wherein the video profile comprises a subset of unpopulated video silos arranged in a video silo structure, the subset of unpopulated video silos selected from a plurality of pre-defined video silos, wherein each unpopulated video silo corresponds to a topic, is not populated with a video, but is configured to be populated with at least one video;

provide, for display via a video silo user interface, the video silo structure including the subset of unpopulated video silos;

populate a video silo of the subset of unpopulated video silos with a selected video received from a first client device of the first user;

in response to populating the video silo, modify the video silo structure to add at least one additional unpopulated video silo from the plurality of pre-defined video silos to the video profile of the first user, wherein the at least one additional unpopulated video silo corresponds to an additional topic, is not populated with a video, but is configured to be populated with one or more videos; and provide, for display via the video silo user interface, the modified video silo structure including the at least one additional unpopulated video solo, the populated video silo, and remaining unpopulated video silos from the subset of unpopulated video silos.

17. The non-transitory computer readable medium of claim 16, wherein the video silo structure comprises video silos organized into a plurality of categories.

18. The non-transitory computer readable medium of claim 16, further comprising instructions that, when executed by the at least one processor, cause the computer system to:

provide the video received from the first client device corresponding to the populated video silo for display via a user interface;

based on a first user interaction type with the user interface, provide a second video corresponding to the populated video silo for display via the user interface; and based on a second user interaction type with the user interface, provide a third video corresponding to a second populated video silo for display via the user interface.

19. The non-transitory computer readable medium of claim 16, further comprising instructions that, when executed by the at least one processor, cause the computer system to:

provide for display to a second client device of a second user, a user interface comprising a list of indicators of video profiles of a plurality of users, the list of indicators comprising a visual indicator of the video profile of the first user; and based on an indication of user interaction, via the second client device of the second user, with the visual indicator of the video profile of the first user, provide the video profile for display to the second client device such that the second user can view the video.

20. The non-transitory computer readable medium of claim 19, further comprising instructions that, when executed by the at least one processor, cause the computer system to:

receive, via the second client device of the second user, an indication of user interaction with the populated video silo from the video profile of the first user; and based on the indication of user interaction with the populated video silo from the video profile of the first user, modify a video silo structure corresponding to the second user to include an unpopulated video silo corresponding to the populated video silo from the video profile of the first user.

* * * * *